US009877145B2

(12) United States Patent
Sakoda et al.

(10) Patent No.: US 9,877,145 B2
(45) Date of Patent: Jan. 23, 2018

(54) WIRELESS COMMUNICATION APPARATUS AND METHOD FOR A USER WIRELESSLY RECEIVING INFORMATION REGARDING BELONGINGS OF A NEARBY PERSON

(71) Applicant: SONY CORPORATION, Tokyo (JP)

(72) Inventors: Kazuyuki Sakoda, Chiba (JP); Akihiro Ihori, Kanagawa (JP); Takatoshi Nakamura, Tokyo (JP); Kazutoshi Serita, Tokyo (JP); Erika Saito, Tokyo (JP); Yueting Hu, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/304,571

(22) PCT Filed: Mar. 4, 2015

(86) PCT No.: PCT/JP2015/056290
§ 371 (c)(1),
(2) Date: Oct. 17, 2016

(87) PCT Pub. No.: WO2015/163011
PCT Pub. Date: Oct. 29, 2015

(65) Prior Publication Data
US 2017/0048654 A1 Feb. 16, 2017

(30) Foreign Application Priority Data

Apr. 24, 2014 (JP) ................. 2014-089723

(51) Int. Cl.
*H04W 4/00* (2009.01)
*G06Q 30/02* (2012.01)
(Continued)

(52) U.S. Cl.
CPC ............ *H04W 4/008* (2013.01); *G06Q 30/02* (2013.01); *H04M 11/00* (2013.01); *H04W 84/18* (2013.01)

(58) Field of Classification Search
CPC ............ G06C 30/0241; G06C 30/0257; G06C 30/0261; G06C 30/0267; G06C 30/0278;
(Continued)

(56) References Cited

U.S. PATENT DOCUMENTS

2002/0144007 A1* 10/2002 Shteyn .................. G06Q 30/02
719/313
2003/0195814 A1* 10/2003 Striemer ................ G06Q 30/02
705/26.8
(Continued)

FOREIGN PATENT DOCUMENTS

JP  2009-123084 A  6/2009
JP  2009-239385 A  10/2009
(Continued)

OTHER PUBLICATIONS

Masahiro, et al., "Support System for Inducing Similar Purchases", Information Processing Society of Japan Interaction 2013, Mar. 2, 2013, pp. 601-603. (Translation of Abstract Only).
(Continued)

*Primary Examiner* — Devan Sandiford
(74) *Attorney, Agent, or Firm* — Chip Law Group

(57) ABSTRACT

Information on the belongings of a nearby-present person is easily acquired. An information processing apparatus comprises a reception unit and a control unit. Herein, the reception unit is directed for receiving belongings information of the user of other information processing apparatus transmitted from the other information processing apparatus by use of wireless communication. Further, the control unit is directed for causing the received belongings information to be output and controlling evaluation information on the belongings information to be transmitted to the other information processing apparatus by use of wireless communication on the basis of a user operation for the belongings information.

13 Claims, 19 Drawing Sheets

(51) Int. Cl.
*H04M 11/00* (2006.01)
*H04W 84/18* (2009.01)
(58) Field of Classification Search
CPC ... G06C 30/0282; H04W 4/008; H04W 84/18
See application file for complete search history.

(56) References Cited

U.S. PATENT DOCUMENTS

| | | | | |
|---|---|---|---|---|
| 2014/0010449 | A1* | 1/2014 | Haaramo | G06T 19/00 382/173 |
| 2015/0254710 | A1* | 9/2015 | Black | G06Q 30/0255 705/14.53 |
| 2015/0363660 | A1* | 12/2015 | Vidal | G06F 17/30277 382/173 |
| 2016/0065903 | A1* | 3/2016 | Wang | B60R 11/04 348/148 |
| 2016/0086202 | A1* | 3/2016 | Wu | G06Q 30/0203 705/7.32 |

FOREIGN PATENT DOCUMENTS

| | | |
|---|---|---|
| JP | 2010-178176 A | 8/2010 |
| JP | 2011-044015 A | 3/2011 |

OTHER PUBLICATIONS

Masahiro, et al, "Support System for Inducing Similar Purchases", Information Processing Society of Japan, Mar. 2, 2013, pp. 601-603.

* cited by examiner

FIG. 3

CONTENT MANAGEMENT TABLE
300

| CONTENT ID | DISTRIBUTION INFORMATION ATTRIBUTE | DISTRIBUTION INFORMATION | DETAILED INFORMATION | EXPIRATION DATE | VALID/ INVALID INFORMATION | LINK INFORMATION | NOTIFICATION FREQUENCY |
|---|---|---|---|---|---|---|---|
| 001 | CLOTHES | ENTIRE THUMBNAIL IMAGE | DETAILED IMAGES OF PARTS ETC. | 2014 0303 | VALID | URL | HIGH |
| 002 | ELECTRONIC DEVICE | ENTIRE THUMBNAIL IMAGE | DETAILED IMAGES OF PARTS ETC. | 2014 0307 | INVALID | URL | LOW |
| 003 | ACCESSORY | ENTIRE THUMBNAIL IMAGE | DETAILED IMAGES OF PARTS ETC. | 2014 0517 | VALID | URL | HIGH |
| 004 | APPLICATION | THUMBNAIL IMAGE OF DISPLAY SCREEN | DETAILED IMAGES OF PARTS ETC. | 2014 0107 | INVALID | URL | LOW |
| ⋮ | ⋮ | ⋮ | ⋮ | ⋮ | ⋮ | ⋮ | ⋮ |

TITLE INFORMATION MANAGEMENT TABLE
320

| USER IDENTIFIER | TERMINAL IDENTIFIER | CONTENT ID | DISTRIBUTION INFORMATION ATTRIBUTE | DISTRIBUTION INFORMATION CONTENT | RECEPTION TIME |
|---|---|---|---|---|---|
| YZ123 | ASDFG | 467 | ACCESSORY | ENTIRE THUMBNAIL IMAGE | 2014 0304 12:12 |
| YS456 | ZXCVB | 452 | ELECTRONIC DEVICE | ENTIRE THUMBNAIL IMAGE | 2014 0504 10:17 |
| ERGYU | FK546 | 231 | APPLICATION | THUMBNAIL IMAGE OF DISPLAY SCREEN | 2014 0307 05:18 |
| G34SD | GUS56 | 842 | CLOTHES | ENTIRE THUMBNAIL IMAGE | 2014 0314 02:10 |
| ⋮ | ⋮ | ⋮ | ⋮ | ⋮ | ⋮ |

FIG. 7

PERSONAL FILTER
330

| DISTRIBUTION INFORMATION ATTRIBUTE | EVALUATION VALUE |
|---|---|
| CLOTHES | +342 |
| ELECTRONIC DEVICE | +152 |
| ACCESSORY | +342 |
| APPLICATION | +123 |
| ENTERTAINMENT | +17 |
| SPORTS | +3 |
| GAME | +217 |
| ⋮ | ⋮ |

331 332

INFORMATION DISTRIBUTION LOG
350

| CONTENT ID | DETAILED INFORMATION REQUEST REACTION | FEEDBACK INFORMATION REACTION |
|---|---|---|
| 001 | 130 | 34 |
| 002 | 340 | 56 |
| 003 | 45 | 65 |
| 004 | 2 | 6 |
| ⋮ | ⋮ | ⋮ |

INCENTIVE POINT MANAGEMENT TABLE
360

| USER IDENTIFIER (361) | INCENTIVE POINT (362) |
|---|---|
| YZ177 | 130 |
| YZ123 | 340 |
| YS456 | 45 |
| ERGYU | 2 |
| G34SD | 8 |
| ⋮ | ⋮ |

WIRELESS COMMUNICATION APPARATUS AND METHOD FOR A USER WIRELESSLY RECEIVING INFORMATION REGARDING BELONGINGS OF A NEARBY PERSON

CROSS REFERENCE TO RELATED APPLICATIONS

This application is a U.S. National Phase of International Patent Application No. PCT/JP2015/056290 filed on Mar. 4, 2015, which claims priority benefit of Japanese Patent Application No. JP 2014-089723 filed in the Japan Patent Office on Apr. 24, 2014. Each of the above-referenced applications is hereby incorporated herein by reference in its entirety.

TECHNICAL FIELD

The present technique relates to an information processing apparatus. More specifically, the present technique relates to an information processing apparatus and an information processing method for exchanging information by use of wireless communication, and a program for causing a computer to perform the method.

BACKGROUND ART

There are conventionally wireless communication techniques for exchanging information by use of wireless communication. For example, there is proposed a communication method (such as ad-hoc communication or ad-hoc network) for autonomously making mutual connection with a nearby information processing apparatus (see Patent Document 1, for example).

CITATION LIST

Patent Document

Patent Document 1: Japanese Patent Application Laid-Open No. 2009-239385

SUMMARY OF THE INVENTION

Problems to be Solved by the Invention

According to the above conventional technique, it is possible to exchange information between two information processing apparatuses by use of wireless communication even though not connected in a wired line.

For example, it is assumed herein that a nearby-present person wears a nice jacket. If he/she knows the person who wears the nice jacket, he/she can easily ask the person about the jacket.

However, if he/she does not know the person, he/she cannot easily ask the person about the jacket. In such a case, it is assumed the person who is interested in the jacket may lose interest in the jacket overtime. Further, the company which manufactures and sells the jacket may lose the opportunity to advertise the jacket and the opportunity to sell it. Thus, it is important that a person who is interested in a jacket which his/her nearby person wears can easily acquire the information on the jacket.

The present technique has been made in terms of the situations, and it is an object thereof to easily acquire the information on the belongings of a nearby-present person.

Solutions to Problems

The present technique is made in order to solve the above problems, and a first aspect thereof is an information processing apparatus comprising a reception unit for receiving belongings information of the user of other information processing apparatus transmitted from the other information processing apparatus by use of wireless communication, and a control unit for causing the received belongings information to be output and controlling evaluation information on the belongings information to be transmitted to the other information processing apparatus by use of wireless communication on the basis of a user operation for the belongings information, an information processing method therefor, and a program for causing a computer to perform the method. Thereby, there is caused an operation in which the received belongings information is output and the evaluation information on the belongings information is transmitted to the other information processing apparatus by use of wireless communication on the basis of a user operation for the belongings information.

According to the first aspect, the belongings information may be assumed as information for notifying the belongings of the user of the other information processing apparatus or the objects worn by the user of the other information processing apparatus to other users. Thereby, there is caused an operation in which the belongings of the user of the other information processing apparatus or the objects worn by the user of the other information processing apparatus are output.

Furthermore, in the first aspect, the control unit may display, on a display unit, the images of the objects owned by the user of the other information processing apparatus or the objects worn by the user of the other information processing apparatus on the basis of the received belongings information. Thereby, there is caused an operation of displaying the images indicating the objects owned by the user of the other information processing apparatus or the objects worn by the user of the other information processing apparatus on the display unit on the basis of the received belongings information.

Furthermore, in the first aspect, when the user operation of requesting detailed information on the belongings information is accepted, the control unit may transmit a detailed information request to request the detailed information as the evaluation information to the other information processing apparatus. Thereby, there is caused an operation of transmitting the detailed information request to the other information processing apparatus when the user operation of requesting the detailed information on the belongings information is accepted.

Furthermore, in the first aspect, the other information processing apparatus may transmit the detailed information corresponding to the detailed information request transmitted from the information processing apparatus to the information processing apparatus, and the control unit causes the detailed information transmitted from the other information processing apparatus to be output. Thereby, the other information processing apparatus causes an operation of transmitting the detailed information corresponding to the detailed information request transmitted from the information processing apparatus to the information processing apparatus, and the information processing apparatus causes an operation of causing the detailed information transmitted from the other information processing apparatus to be output.

Furthermore, in the first aspect, when the user operation of evaluating the belongings information is accepted, the control unit may transmit feedback information for evaluating the belongings information as the evaluation information to the other information processing apparatus. Thereby, there is caused an operation of transmitting the feedback information to the other information processing apparatus when the user operation of evaluating the belongings information is accepted.

Furthermore, in the first aspect, the control unit may generate management information for managing the belongings information for which the evaluation information is transmitted per attribute. Thereby, there is caused an operation of generating the management information for managing the information on the owner transmitting the evaluation information per attribute.

Furthermore, in the first aspect, when receiving a plurality of items of belongings information, the control unit may extract owner information to be output from the plurality of items of belongings information on the basis of the management information. Thereby, there is caused an operation of extracting the owner information to be output from the items of belongings information on the basis of the management information when the items of owner information are received.

Furthermore, in the first aspect, a plurality of information processing apparatuses may make wireless communication on one-to-one basis so that the other information processing apparatus transmits the belongings information in a network in which the information processing apparatuses are mutually connected, and the control unit transmits the evaluation information in the network. Thereby, the other information processing apparatus causes an operation of transmitting the belongings information in the network, and the information processing apparatus causes an operation of transmitting the evaluation information in the network.

Furthermore, in the first aspect, only when the owner information to be transmitted is present and an information processing apparatus capable of making wireless communication on one-to-one basis is present, the other information processing apparatus may transmit the belongings information. Thereby, the other information processing apparatus causes an operation of transmitting the belongings information only when the owner information to be transmitted is present and an information processing apparatus capable of making wireless communication on one-to-one basis is present.

Furthermore, in the first aspect, the other information processing apparatus may sum up the evaluation information transmitted from the information processing apparatuses thereby to manage it per item of belongings information. Thereby, the other information processing apparatus causes an operation of summing up the evaluation information transmitted from the information processing apparatus and managing it per belongings information.

Furthermore, in the first aspect, when the value added by the summing meets the predetermined condition, the other information processing apparatus may be provided with an incentive point corresponding to the value from a server. Thereby, when the value added by the summing meets the predetermined condition, the other information processing apparatus causes an operation of being provided with an incentive point corresponding to the value from the server.

Effects of the Invention

According to the present technique, there is obtained an excellent effect that a nearby-present person can easily acquire information on belongings. The effects described herein are not necessarily limited, and any effect described in the present disclosure may be obtained.

BRIEF DESCRIPTION OF DRAWINGS

FIG. 3 is a diagram schematically illustrating exemplary management contents of a content management table 300 stored in a storage unit 140 according to the exemplary embodiment of the present technique.

FIG. 6 is a diagram schematically illustrating exemplary management contents of a title information management table 320 stored in the storage unit 140 according to the exemplary embodiment of the present technique.

FIG. 7 is a diagram schematically illustrating exemplary management contents of a personal filter 330 stored in the storage unit 140 according to the exemplary embodiment of the present technique.

MODE FOR CARRYING OUT THE INVENTION

The mode for carrying out the present technique (which will be denoted as exemplary embodiment below) will be described below. The description will be made in the following order.

1. Exemplary embodiment (communication control: example of providing title information received from nearby-present information processing apparatus to user)
2. Exemplary applications
<1. Exemplary Embodiment>
[Exemplary Structure of Communication System]

Figure 1:
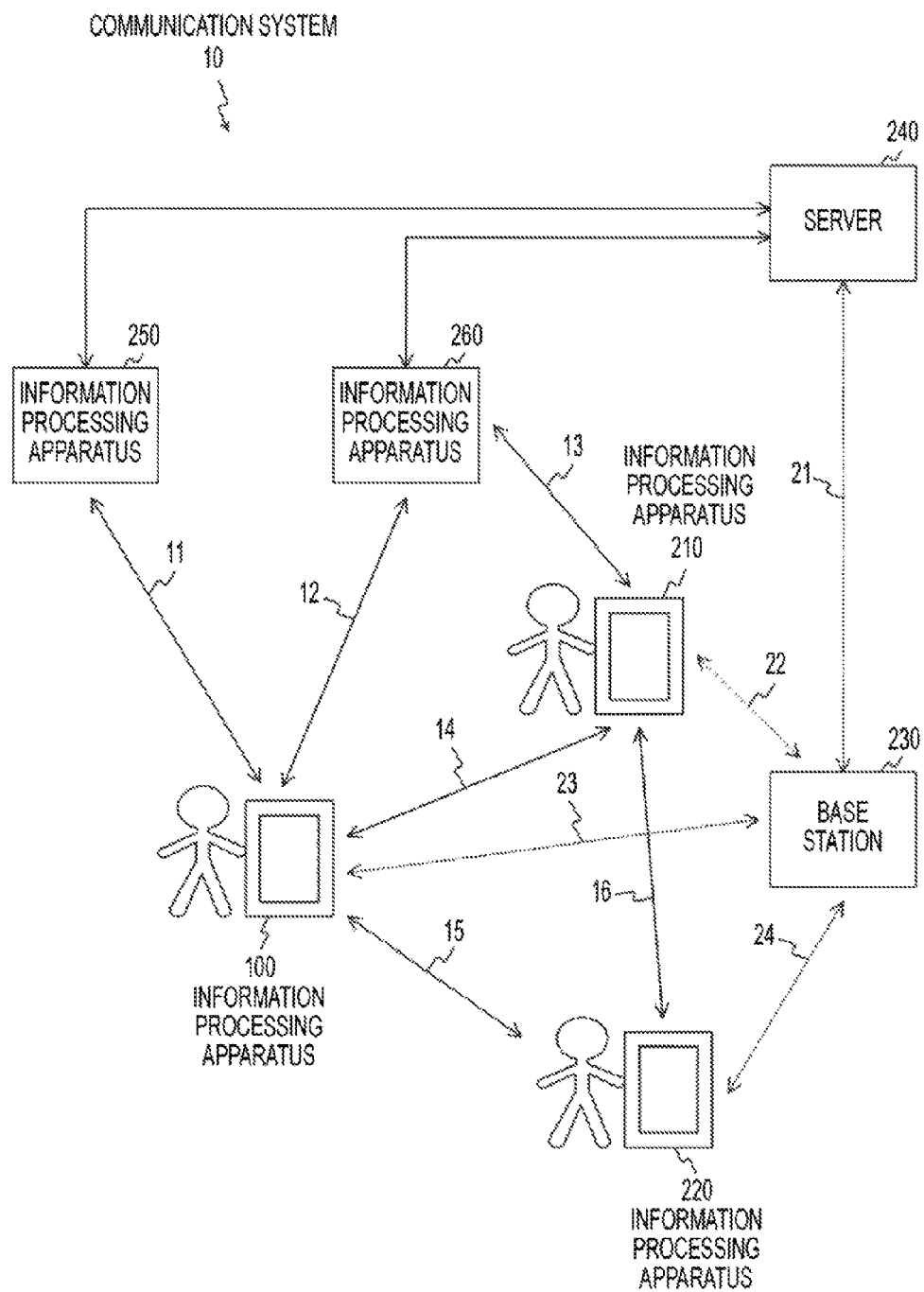
FIG. 1 is a diagram illustrating an exemplary system structure of a communication system 10 according to an exemplary embodiment of the present technique.

FIG. 1 is a diagram illustrating an exemplary system structure of a communication system 10 according to an exemplary embodiment of the present technique.

The communication system 10 comprises an information processing apparatus 100, an information processing apparatus 210, an information processing apparatus 220, a base station 230, a server 240, an information processing apparatus 250, and an information processing apparatus 260.

The information processing apparatus 100, the information processing apparatus 210, and the information processing apparatus 220 are portable information processing apparatuses comprising a wireless communication function, for example. Herein, the portable information processing apparatuses are Smartphone, cell phone, tablet terminal, and the like. Further, it is assumed that each user holds and carries the information processing apparatus 100, the information processing apparatus 210, or the information processing apparatus 220.

The information processing apparatus 250 and the information processing apparatus 260 are fixed information processing apparatuses comprising a wireless communication function, for example. The fixed information processing apparatuses are printer, personal computer, object, and the like. The object is an information processing apparatus installed downtown in a fixed manner, for example, and provides various items of information to other information processing apparatuses by use of wireless communication.

The base station 230 is a base station (such as cellular base station or access point) which is connected to each information processing apparatus by use of wireless communication and exchanges each item of information therewith. Further, the base station 230 is connected to the server 240 by use of wireless communication or wired communication, transmits information from each information processing apparatus to the server 240, and transmits information from the server 240 to each information processing apparatus.

For example, the base station 230 can make wireless communication in a 3GPP (3rd Generation Partnership Project) communication system. Herein, the 3GPP specification is W-CDMA (Wideband Code Division Multiple Access), GSM (registered trademark) (Global System for Mobile Communications), WiMAX (Worldwide Interoperability for Microwave Access), WiMAX2, LTE (Long Term Evolution), or LTE-A (Advanced), for example. Further, the base station 230 can make wireless communication in a wireless LAN (Local Area Network) communication system, for example.

The server 240 is an information processing apparatus (such as Cloud server) for providing various items of information to each information processing apparatus in response to a request from each information processing apparatus. For example, the server 240 is connected to the information processing apparatuses 250 and 260 by use of wireless communication or wired communication, and exchanges various items of information with the information processing apparatuses 250 and 260. Further, for example, the server 240 is connected to the base station 230 by use of wireless communication or wired communication, and exchanges various items of information with the information processing apparatuses 100, 210, 220, and 230 via the base station 230.

The server 240 manages an incentive point of each information processing apparatus. How the server 240 manages the incentive points will be described in detail with reference to FIG. 10 and FIG. 11.

In FIG. 1, the communication paths in wireless communication between the apparatuses are indicated by the arrows 11 to 16. Wireless communication made between the apparatuses (wireless communication in the communication paths indicated by the arrows 11 to 16) is realized by a communication method for autonomously making mutual connection with a nearby information processing apparatus. The communication paths in wireless communication made between the information processing apparatuses 100, 210, 220 and the server 240 via the base station 230 are indicated by the dotted arrows 21 to 24.

There is known ad-hoc communication or ad-hoc network for the communication method for autonomously making mutual connection with a nearby information processing apparatus. In such a network, each information processing apparatus can make mutual communication with a nearby information processing apparatus without depending on a master station (such as control device). Thus, the communication method for autonomously making mutual connection with a nearby information processing apparatus will be described according to the exemplary embodiment of the present technique by way of ad-hoc network or mesh network.

In the ad-hoc network, when a new information processing apparatus is added nearby, the new information processing apparatus can freely participate in the network. In this way, the coverage area of the network can be increased depending on an increase in information processing apparatuses (nearby information processing apparatuses). That is, as an information processing apparatus is sequentially added, the coverage area of the network can be increased.

Each information processing apparatus can autonomously make mutual connection with a nearby information processing apparatus, and can additionally transfer information exchanged with other information processing apparatuses in a bucket brigade manner.

For example, it is assumed that there is an information processing apparatus incapable of making direct communication with the information processing apparatus 100 since it is outside a service area. Even when direct communication cannot be made, an information processing apparatus (the information processing apparatus 210 or 220) capable of making direct communication with the information processing apparatus 100 can transfer the data of the information processing apparatus 100 to the information processing apparatus. Thus, the data is transferred in this way so that the information processing apparatus 100 can mutually exchange the information with the information processing apparatus incapable of making direct communication with the information processing apparatus 100 via either of the information processing apparatuses 210 and 220.

The method in which data transfer (or bucket brigade) is mutually performed to transfer the information to a distant information processing apparatus is denoted as multi-hop relay. A network for performing multi-hop is generally known as mesh network.

[Exemplary Structure of Information Processing Apparatus]

Figure 2:
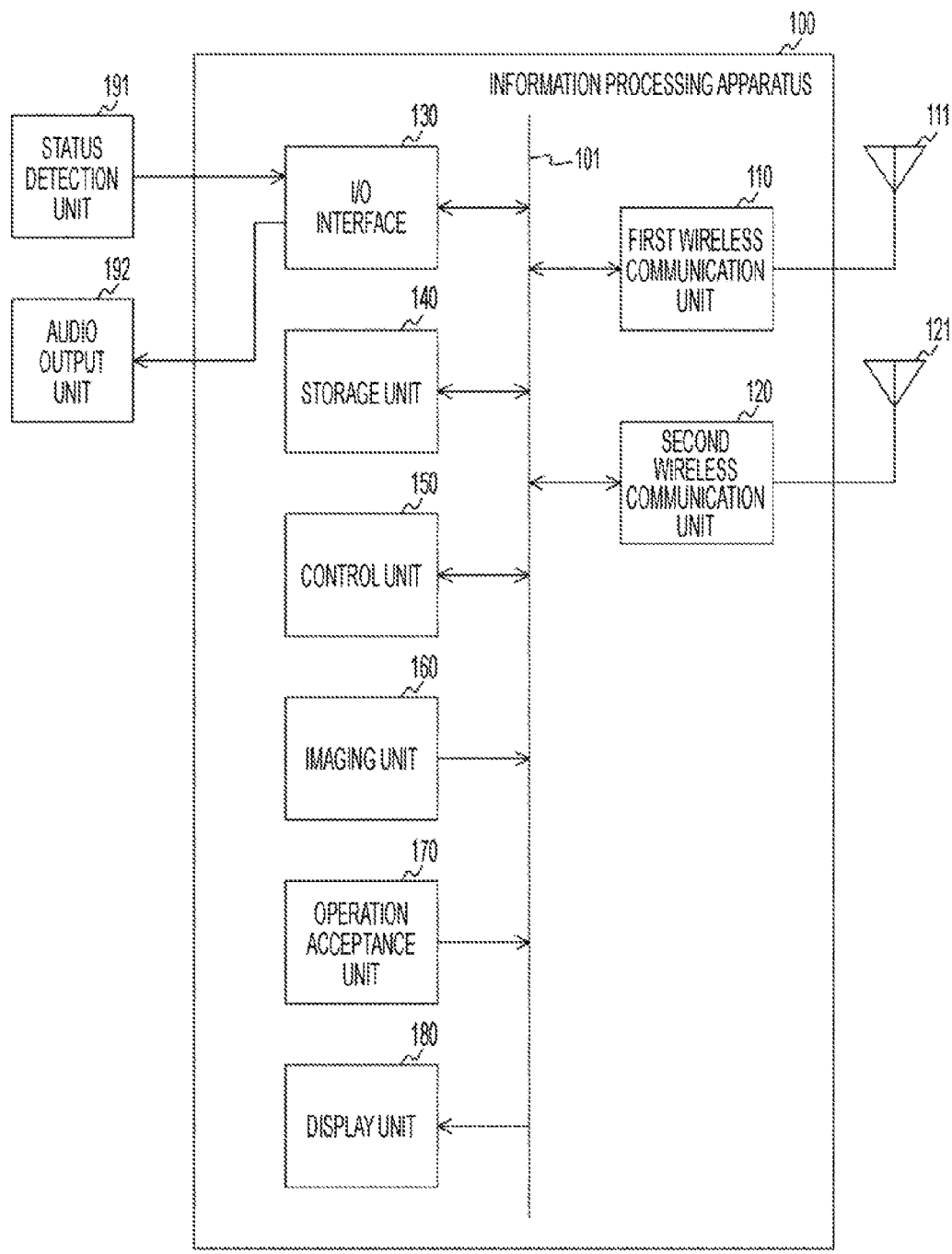
FIG. 2 is a block diagram illustrating an exemplary internal structure of an information processing apparatus 100 according to the exemplary embodiment of the present technique.

FIG. 2 is a block diagram illustrating an exemplary internal structure of the information processing apparatus 100 according to the exemplary embodiment of the present technique. The internal structures of other information processing apparatuses (the information processing apparatuses 210, 220, 250, and 260) are substantially the same as that of the information processing apparatus 100, and thus only the information processing apparatus 100 will be described herein and a description of the other information processing apparatuses will be omitted.

The information processing apparatus 100 is a portable information processing apparatus (such as Smartphone, tablet terminal or cell phone) capable of being carried by a user as described above.

The information processing apparatus 100 comprises a first wireless communication unit 110, an antenna 111, a second wireless communication unit 120, and an antenna 121. The information processing apparatus 100 further comprises an I/O (Input/Output) interface 130, a storage unit 140, a control unit 150, an imaging unit 160, an operation acceptance unit 170, and a display unit 180. The respective units are connected via a bus 101.

The first wireless communication unit 110 is a module (such as cellular modem or wireless LAN (Local Area Network) modem) for exchanging radio waves via the antenna 111. For example, the first wireless communication unit 110 can make wireless communication in a 3GPP communication system. For example, the first wireless communication unit 110 can make wireless communication in a wireless LAN communication system.

For example, the first wireless communication unit 110 is connected to a base station (such as cellular base station or access point) under control of the control unit 150, and can exchange each item of information therewith by use of wireless communication. For example, the first wireless communication unit 110 is connected to other apparatus (such as Cloud server) via a base station (such as cellular base station), and can exchange each item of information with the other apparatus. For example, the first wireless communication unit 110 is connected to the server 240 via the base station 230, and can exchange each item of information with the server 240.

The second wireless communication unit 120 is a module (such as wireless LAN modem) for exchanging radio waves via the antenna 121. For example, the second wireless communication unit 120 can make wireless communication with other information processing apparatus which is present physically nearby.

For example, the second wireless communication unit 120 can make wireless communication via millimeter wave communication (such as 60 GHz), 900 MHz/2.4 GHz/5 GHz wireless LAN, or UWB (Ultra Wide Band). Further, for example, the second wireless communication unit 120 can make wireless communication in visible light communication or NFC (Near Field Communication).

For example, the second wireless communication unit 120 can transfer each item of information to other information processing apparatuses via an information processing apparatus under control of the control unit 150. The method in which data transfer (or bucket brigade) is mutually performed to transfer information to a distant information processing apparatus is denoted as multi-hop relay. A network for performing multi-hop is generally known as mesh network. When data transfer is performed in this way, the second wireless communication unit 120 exchanges a signal for generating or updating a multi-hop communication path with other information processing apparatus by use of wireless communication. The second wireless communication unit 120 is an exemplary reception unit described in CLAIMS.

Further, the first wireless communication unit 110 and the second wireless communication unit 120 may make wireless communication by use of radio waves (electromagnetic waves) or may make wireless communication using a medium other than radio waves (such as wireless communication made by use of magnetic field).

Further, the first wireless communication unit 110 and the second wireless communication unit 120 may be configured as different devices, or the first wireless communication unit 110 and the second wireless communication unit 120 may be realized in the same physical device.

The I/O interface 130 is an interface with an external device such as sensor actuator operating in association with the information processing apparatus 100. FIG. 2 illustrates an example in which a status detection unit 191 and an audio output unit 192, as the external devices, are connected to the I/O interface 130. FIG. 2 further illustrates an example in which the status detection unit 191 and the audio output unit 192 are provided outside the information processing apparatus 100, but all or part of them may be incorporated in the information processing apparatus 100. Further, an external device such as wearable computer or wearable terminal may be connected to the I/O interface 130 for use.

The status detection unit 191 is directed for detecting a status (such as position, posture or movement distance) of the information processing apparatus 100 by detecting acceleration, motion, tilt or the like of the information processing apparatus 100. The status detection unit 191 then outputs the status information on the detected status to the control unit 150 via the I/O interface 130. For example, the status detection unit 191 holds movement information (log (or real-time information on movement)) indicating whether the information processing apparatus 100 moves, and supplies it to the control unit 150. The status detection unit 191 may employ an acceleration sensor, gyro sensor, or GPS (Global Positioning System), for example. For example, the status detection unit 191 can calculate a movement distance (such as movement distance per unit time) of the information processing apparatus 100 by use of position information (such as latitude and longitude) detected by GPS.

The audio output unit 192 is an audio output unit (such as speaker) for outputting various audio under control of the control unit 150.

The storage unit 140 is a memory for storing various items of information therein. For example, various items of information (such as control programs) required by the information processing apparatus 100 for performing desired operations are stored in the storage unit 140. Further, the storage unit 140 stores therein a content management table 300 illustrated in FIG. 3, a title information management table 320 illustrated in FIG. 6, a personal filter 330 illustrated in FIG. 7, and an information distribution log 350 illustrated in FIG. 9. Further, the storage unit 140 stores various contents such as music contents or image contents (such as animation contents and still image contents).

The control unit 150 is directed for controlling each unit in the information processing apparatus 100 according to the control programs stored in the storage unit 140. For example, the control unit 150 performs the signal processings on exchanged information. Further, the control unit 150 is realized by CPU (Central Processing Unit).

For example, when the second wireless communication unit 120 transmits data by use of wireless communication, the control unit 150 processes the information read from the storage unit 140 or a signal or the like input from the I/O interface 130 thereby to generate a chunk of data (transmission packet) to be actually transmitted. Subsequently, the control unit 150 outputs the generated transmission packet to the second wireless communication unit 120. Further, the second wireless communication unit 120 converts the transmission packet into a communication system format for actual transmission, and then transmits the converted transmission packet to the outside from the antenna 121.

For example, when the second wireless communication unit 120 receives data by use of wireless communication, the second wireless communication unit 120 performs the signal processing by a receiver in the second wireless communication unit 120 on a radio wave signal received via the antenna 121 thereby to extract a reception packet. The control unit 150 then interprets the extracted reception packet. As a result of the interpretation, when it is determined that the data is to be held, the control unit 150 writes the data in the storage unit 140. When it is determined that the data is to be transferred to other information processing apparatuses, the control unit 150 outputs the data as a transmission packet to be transferred to other information processing apparatuses to the second wireless communication unit 120. Further, when it is determined that the data is to be output, the control unit 150 outputs it to the display unit 180 or outputs it to the outside (such as the audio output unit 192) from the I/O interface 130.

For example, the control unit 150 can provide various contents stored in the storage unit 140 to other information processing apparatuses by use of wireless communication.

When the information processing apparatus 100 is driven by a battery, the information processing apparatus 100 is mounted (incorporated or attached) with the battery. In this case, the control unit 150 comprises a function of estimating the remaining amount of the battery, and can acquire the estimated remaining amount of the battery as needed.

The imaging unit 160 is directed for shooting an object and generating an image (image data), and outputs the generated image to the control unit 150. The imaging unit 160 is configured of an optical system (lenses), an imaging device, and a signal processing unit, for example. For example, the imaging unit 160 can shoot an image (such as multi-dimensional code (such as QR (Quick Response) code (registered trademark))) and generate its image data (such as multi-dimensional code image data). In this case, the control unit 150 can analyze the image (analyze the QR code, for example) on the basis of the image data generated by the imaging unit 160, and can acquire valid information.

The operation acceptance unit 170 is directed for accepting operation input by the user, and outputs operation information depending on the accepted operation input to the control unit 150. The operation acceptance unit 170 is realized by touch panel, keyboard, mouse, or sensor (such as touch interface), for example.

The display unit 180 is directed for displaying various items of information under control of the control unit 150. The display unit 180 may employ a display panel such as organic EL (Electro Luminescence) panel or LCD (Liquid Crystal Display) panel. The operation acceptance unit 170 and the display unit 180 may be integrally configured by use of a touch panel on which the user contacts or closes his/her finger thereby to input an operation.

There will be considered herein a service in which each service (such as menu provided by a restaurant) is electronically distributed to neighboring persons in a public space (such as restaurant). For example, it is assumed that an information processing apparatus (such as object) installed downtown in a fixed manner is associated with electronic information distributed to the information processing apparatus 100. For example, it is assumed that a user walking downtown with the information processing apparatus 100 is interested in one of the objects (fixed information processing apparatuses) present downtown. In this case, the user can shoot an image of his/her-interested object by use of the imaging unit 160 in the information processing apparatus 100, and can acquire image data of his/her-interested object. The user then operates the information processing apparatus 100 thereby to transmit valid information (object information) based on the image data of his/her-interested object to the Cloud server. In this case, the Cloud server can supply the information processing apparatus 100 with the electronic information on the object information. That is, the information processing apparatus 100 can download the electronic information on the object by use of the image of the object installed downtown. The control unit 150 can then store the downloaded electronic information in the storage unit 140 and display it on the display unit 180.

Further, the control unit 150 can transmit the position information (such as latitude and longitude) detected by the status detection unit 191 and the valid information (object information) based on the image data generated by the imaging unit 160 to the Cloud server, for example. In this case, the server 240 can supply the information processing apparatus 100 with the electronic information on the position information and the object information. Also in this case, the information processing apparatus 100 can download the electronic information on the object by use of the image of the object installed downtown. The control unit 150 can then store the downloaded electronic information in the storage unit 140 and display it on the display unit 180. Further, for example, the electronic information can be superimposed on the object present in the real space for display by use of the AR (Augmented Reality) technique.

The electronic information on the object which is installed in the space in a fixed manner and does not change in its shape can be provided to the information processing apparatus 100 by use of image information or the like. However, it is assumed that the electronic information on a moving object (such as person walking around the information processing apparatus 100) is difficult to provide to the information processing apparatus 100.

For example, it is assumed that the user of the information processing apparatus 100 is present in a public space (including public transportation such as train or bus, or gathering place such as café or restaurant). It is assumed that the user of the information processing apparatus 100 feels that "the clothes of that person are nice" or "what is the content (such as animation) the person next to me is watching?" in such a public space. Also in this case, detailed information on the clothes or the content (such as distribution source) cannot be easily known.

Thus, the exemplary embodiment of the present technique demonstrates an example in which the information on nearby-present person's belongings can be easily acquired.

There is an affiliate mechanism in which a person recommends his/her fashion or his/her enjoying content (book or game) to other person and is compensated for his/her recommendation if the recommendation leads to purchase. For example, there is considered a form in which a product is introduced by use of a specific Web site (such as blog) and the site where the product can be purchased is linked. A similar mechanism to the form is performed between physically-nearby persons, the personal information needs to be distributed to the others. However, it is difficult to specify the object of interest, and thus it is assumed that the personal information is difficult to distribute to the others.

Therefore, the exemplary embodiment of the present technique demonstrates an example in which wireless communication is made between the information processing apparatuses by use of wireless LAN or the like thereby to distribute personal information, thereby providing an affiliate-like mechanism between nearby users.

[Exemplary Management Contents of Content Management Table]

FIG. 3 is a diagram schematically illustrating exemplary management contents of the content management table 300 stored in the storage unit 140 according to the exemplary embodiment of the present technique.

The content management table 300 is a table for managing the contents (the contents acquired by the information processing apparatus 100) distributed from the information processing apparatus 100 to other information processing apparatuses. Further, each content is divided into distribution information (title information) and detailed information to be managed per content ID (identification) in the content management table 300.

The content management table 300 stores therein the contents on the objects which the user (owner) having the information processing apparatus 100 wears or, the objects which the user carries with him/her, for example.

The objects which the user wears are his/her clothes, his/her hat, his/her accessory, his/her shoes, and the like.

The objects which the user carries with him/her are his/her bag which the user carries, his/her electronic device which the user carries, applications operating in the information processing apparatus 100, and the like.

For example, the contents (including distribution information and detailed information) on a product which the user having the information processing apparatus 100 purchases can be acquired at the shop where the product is purchased. For example, the contents on the product can be acquired via an access point installed in the shop. Further, for example, the user having the information processing apparatus 100 can shoot and acquire the image information (such as QR code) on his/her-interested product by the imaging unit 160 in the information processing apparatus 100. In this case, the control unit 150 in the information processing apparatus 100 can analyze the QR code acquired by the imaging of the imaging unit 160 and acquire valid contents on the basis of the analysis result.

The content management table 300 associates and stores therein content ID 301, distribution information attribute 302, distribution information 303, detailed information 304, expiration date 305, valid/invalid information 306, link information 307, and notification frequency 308.

The content ID 301 stores therein identification information for identifying a content acquired by the information processing apparatus 100 and managed in the content management table 300. The information processing apparatus 100 transmitting a content managed in the content management table 300 and the information processing apparatus receiving the content, manage the content, and specify the content based on the information stored in the content ID 301. For example, the information processing apparatus 100 transmitting a content and the information processing apparatus receiving the content can manage distribution of the content, provide the detailed information, and specify feedback based on the information stored in the content ID 301. For example, 128-bit data generated at random can be used as the content ID 301. In FIG. 3, the content ID 301 is indicated in a three-digit number for simplified description.

The distribution information attribute 302 stores therein an attribute identifier on a content managed in the content management table 300. The attribute identifier is information indicating which item the content belongs to, and is used for classifying the content. Further, information to which the distribution information to be transmitted to other information processing apparatus relates can be notified by the attribute identifier. For example, when the content is for a jacket, "clothes" is stored as attribute. Further, for example, when the content is for a tablet terminal, "electronic device" is stored as attribute.

The distribution information 303 stores therein information to be distributed when a content managed in the content management table 300 is distributed to other information processing apparatus. Herein, the distribution information 303 stores therein information (such as downsized image (thumbnail image) or text data) with a relatively small amount of data.

For example, when the content is for a jacket, a photograph of the jacket (such as low-resolution frontal photograph), brand name, price, and purchase date (such as jacket purchased last December) are stored. Further, for example, when the content is for a tablet terminal, an entire photograph of the tablet terminal (such as low-resolution frontal photograph), manufacturer name, price, and purchase date (tablet terminal purchased in January this year) are stored.

The detailed information 304 stores therein information to be transmitted in response to a request from other information processing apparatus for a content managed in the content management table 300. For example, when the information processing apparatus transmitting the distribution information stored in the distribution information 303 makes a request to transmit the detailed information on the distribution information, the detailed information stored in the detailed information 304 is transmitted in response to the request. Herein, the detailed information 304 stores therein information (such as high-resolution image) with a relatively large amount of data.

For example, when the content is for a jacket, the photographs of the respective parts of the jacket (such as high-resolution photographs (front, side, and back)) and other information (such as detailed information on material and production place) are stored. Further, for example, when the content is for a tablet terminal, the photographs of the respective parts of the tablet (such as high-resolution photographs (front, side, and back)) and detailed data on its specification are stored.

The expiration date 305 stores therein information on time/date of distribution to other information processing apparatus. For example, when the content is for a jacket, when the jacket is worn (spring, fall or winter) is stored as the expiration date. Further, for example, when the content is for a tablet terminal, a time when a new model of the tablet terminal is assumed to be released is stored as the expiration date. For example, even when the time/date (expiration date) stored in the expiration date 305 is exceeded, the expiration date may be updated (extended) by a user operation.

The valid/invalid information 306 stores therein information (valid/invalid information) on whether to distribute the content to other information processing apparatus. The content for which the expiration date stored in the expiration date 305 is exceeded is stored as invalid. Whether the content is valid or invalid may be set by a user operation. Further, the content for which a predetermined time elapses after it is stored as invalid in the valid/invalid information 306 may be automatically erased.

The link information 307 stores therein link information (such as URL (Uniform Resource Locator)) for accessing an information processing apparatus (such as the server 240 illustrated in FIG. 1) providing the information on the content.

The notification frequency 308 stores therein a frequency at which distribution information is transmitted to other information processing apparatus. For example, when transmission is performed once per second, "high" is stored, and when transmission is performed once per five seconds, "low" is stored. In FIG. 3, only two kinds of high and low are indicated as the notification frequency for simplified description, but three or more kinds may be set. Further, the notification frequency may be set per content by a user operation.

For example, there may be configured such that preference information on whether the user of the information processing apparatus 100 actively transmits distribution information is previously set and the notification frequency is determined based on the preference information. For example, the notification frequency can be determined such that when distribution information is set to be actively transmitted, the notification frequency is increased, and when distribution information is not set to be actively transmitted, the frequency is lowered. For example, the notification frequency may be determined depending on the remaining amount of the battery. For example, the notification frequency can be determined such that when the remaining amount of the battery is larger than a threshold, the notification frequency is increased, and when the remaining amount of the battery is smaller than the threshold, the frequency is lowered. The notification frequency may be determined at distribution information transmission timings, or may be made regularly or irregularly.

[Exemplary Transmission of Title Information]

Figure 4:
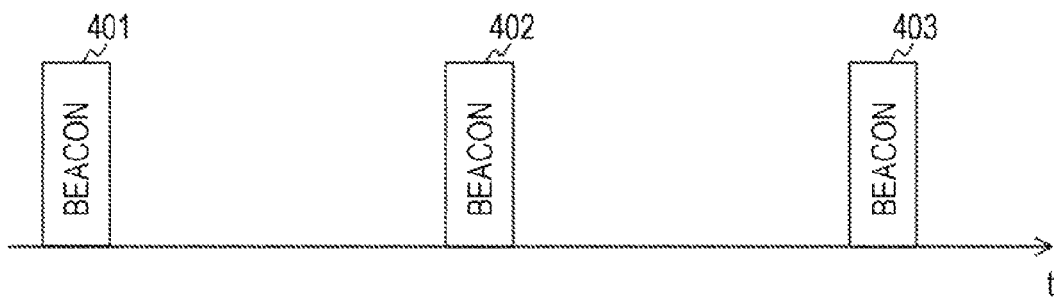
FIG. 4 is a diagram illustrating exemplary transmission when each information processing apparatus configuring the communication system 10 transmits title information according to the exemplary embodiment of the present technique.

FIG. 4 is a diagram illustrating exemplary transmission when each information processing apparatus configuring the communication system 10 according to the exemplary embodiment of the present technique transmits title information.

FIG. 4 illustrates an example in which beacons (beacon signals) including title information are regularly (or irregularly) transmitted. FIG. 4 further illustrates an example in which the beacons are transmitted with the horizontal axis as time axis. That is, FIG. 4 schematically illustrates the beacons 401 to 403 sequentially transmitted in time series. The beacons 401 to 403 illustrated in FIG. 4 are exemplary notification signals transmitted as packet signals. The title information is exemplary belongings information described in CLAIMS.

In this way, each information processing apparatus configuring the communication system 10 regularly (or irregularly) reports title information (included in a beacon) to the neighboring information processing apparatuses. An exemplary structure of a beacon will be described in detail with reference to FIG. 5.

[Exemplary Format of Title Information]

Figure 5:
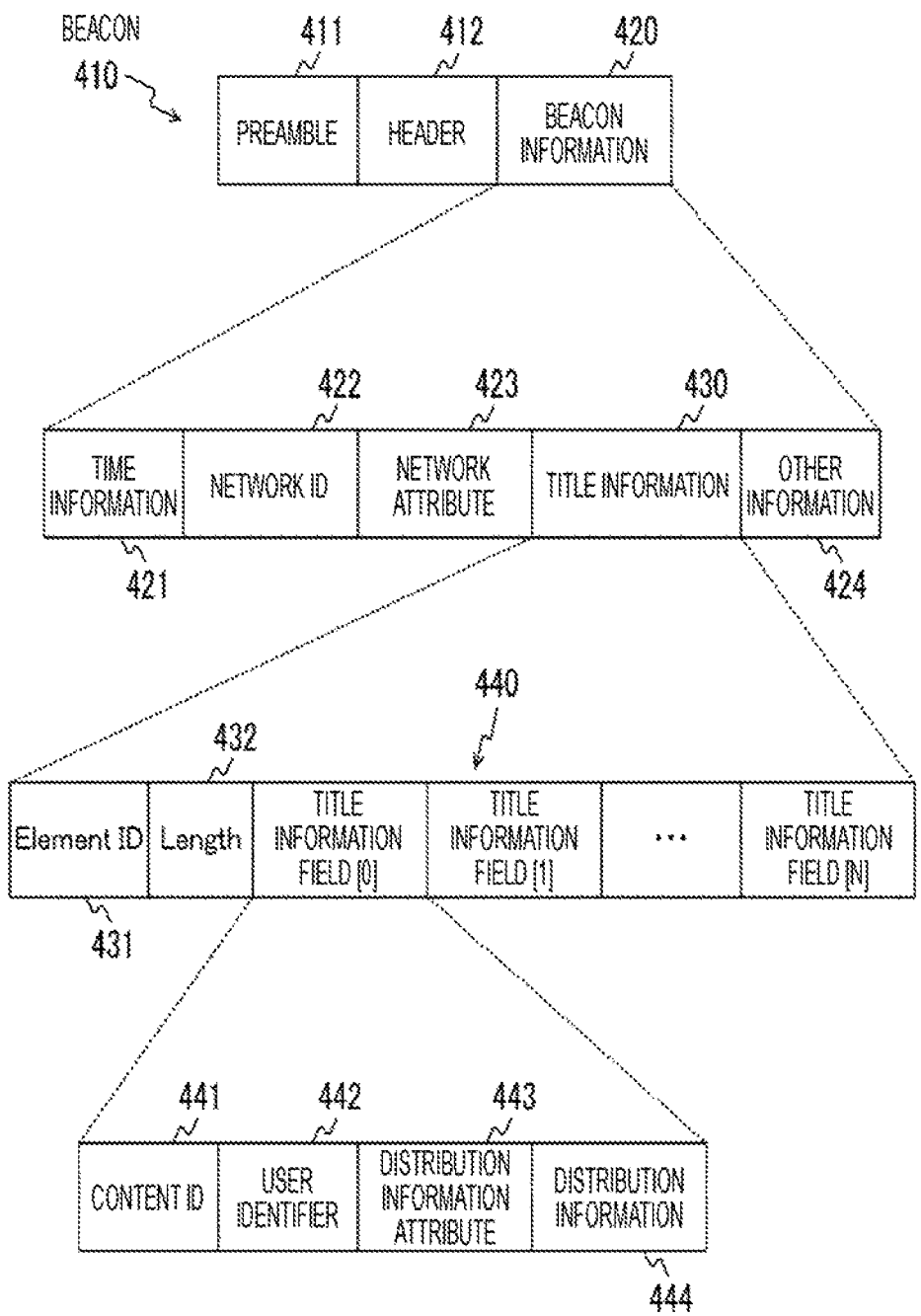
FIG. 5 is a diagram illustrating an exemplary format of a beacon (notification signal) transmitted by each information processing apparatus configuring the communication system 10 according to the exemplary embodiment of the present technique.

FIG. 5 is a diagram illustrating an exemplary format of a beacon (notification signal) transmitted by each information processing apparatus configuring the communication system 10 according to the exemplary embodiment of the present technique.

A beacon 410 includes preamble 411, header 412, and beacon information 420.

The preamble 411 is information on the presence of a packet (beacon). That is, each information processing apparatus configuring the communication system 10 can detect the presence of a beacon in response to receipt of the preamble 411.

The header 412 stores therein information on the packet (beacon) itself arranged at a predetermined position of the packet. For example, the header 412 stores therein various items of information such as transmission source, transmission destination, and packet size (information on packet (beacon) itself). That is, each information processing apparatus configuring the communication system. 10 decodes and analyzes the header. Each information processing apparatus configuring the communication system 10 can detect which information processing apparatus transmits a signal to which information processing apparatus, or which type the signal is of (whether the signal is a beacon) on the basis of the analysis.

The beacon information 420 is information (payload) to be reported to each information processing apparatus configuring the communication system 10. That is, each information processing apparatus configuring the communication system 10 contains information to be reported to other information processing apparatus in a beacon to be transmitted.

The beacon information 420 will be described below in detail.

The beacon information 420 includes time information 421, network ID 422, network attribute 423, title information 430, and other information 424.

The time information 421 indicates a time when a beacon including the information is transmitted from a transmission source information processing apparatus.

The network ID 422 is information (ID) for identifying a network (such as ad-hoc network) configured by the transmission source information processing apparatus.

The network attribute 423 is information on an attribute of the network configured by the transmission source information processing apparatus.

The title information 430 is information (title information) distributed by the transmission source information processing apparatus.

The other information 424 is information other than the above information.

The title information 430 will be described below.

The title information 430 is configured of information fields including Element ID 431, Length 432, and title information fields [0] to [N] 440.

The Element ID 431 indicates that title information is stored.

The Length 432 indicates a length of the element of the title information.

The title information fields [0] to [N] 440 are configured of one or more (such as N) title information fields. One title information field is arranged per title information. For example, three fields are arranged for the information processing apparatus distributing three items of title information (such as title information on jacket, shoes, and hat).

The title information fields [0] to [N] 440 each store content ID 441, user identifier 442, distribution information attribute 443, and distribution information 444. The content ID 441, the distribution information attribute 443, and the distribution information 444 correspond to the content ID 301, the distribution information attribute 302, and the distribution information 303 illustrated in FIG. 3, respectively, and a detailed description thereof will be omitted herein.

The user identifier 442 stores therein identification information (such as user ID) for uniquely specifying the user (owner) of the information processing apparatus transmitting the beacon 410. For example, the e-mail account of the user and the login ID to the service provider are stored as user identifier. The information as encrypted user identifier may be stored in the user identifier 442 in consideration of privacy of the user.

For example, the control unit 150 in the information processing apparatus 100 generates a beacon (such as the beacon 410 illustrated in FIG. 5) including the information (the content ID 301, the distribution information attribute 302, and the distribution information 303) stored in the content management table 300 illustrated in FIG. 3. The control unit 150 in the information processing apparatus 100 then transmits the generated beacon in broadcast (or multicast). When the information processing apparatus 100 transmits the beacon in broadcast (or multicast) in this way, the neighboring information processing apparatuses (such as the information processing apparatuses 210 and 220) receive the beacon. The information processing apparatuses 210 and 220 can then detect that the beacon is transmitted from the information processing apparatus 100 on the basis of the header of the received beacon. Further, the information processing apparatuses 210 and 220 can display the title information on each display unit on the basis of the contents of the beacon information 420 included in the received beacon. Further, the information processing apparatuses 210 and 220 can grasp the contents and the like capable of being provided by the information processing apparatus 100 on the basis of the contents of the beacon information 420 included in the received beacon.

The title information may be transmitted in response to a request from other information processing apparatus. For example, when a title information transmission request (distribution request (inquiry signal)) is received, the title information may be transmitted to the information processing apparatus transmitting the transmission request in response to the transmission request. Further, the title information may be distributed according to a method for transmitting a beacon signal or probe signal in a wireless LAN system.

[Exemplary Management Contents of Title Information Management Table]

FIG. 6 is a diagram schematically illustrating exemplary management contents of the title information management table 320 stored in the storage unit 140 according to the exemplary embodiment of the present technique.

The title information management table 320 is a table for managing title information transmitted from other information processing apparatuses.

Specifically, the title information management table 320 associates and stores therein user identifier 321, terminal identifier 322, content ID 323, distribution information attribute 324, distribution information 325, and reception time 326. The content ID 323, the distribution information attribute 324, and the distribution information 325 correspond to the content ID 301, the distribution information attribute 302, and the distribution information 303 illustrated in FIG. 3, respectively. Further, the user identifier 321 corresponds to the user identifier 442 illustrated in FIG. 5. Therefore, a detailed description thereof will be omitted herein.

The terminal identifier 322 stores therein identification information for identifying the information processing apparatus transmitting the title information. For example, the MAC (Media Access Control) address and the IP (Internet Protocol) address of the information processing apparatus are stored as terminal identifier.

The reception time 326 stores therein a time when title information is received.

[Exemplary Management Contents of Personal Filter]

FIG. 7 is a diagram schematically illustrating exemplary management contents of the personal filter 330 stored in the storage unit 140 according to the exemplary embodiment of the present technique.

The personal filter 330 is a table for managing information on preference of the user having the information processing apparatus 100. For example, the received title information can be selected or refused depending on the user's preference by use of the personal filter 330.

Specifically, the personal filter 330 associates and stores therein distribution information attribute 331 and evaluation value 332. The distribution information attribute 331 corresponds to the distribution information attribute 302 illustrated in FIG. 3 and the distribution information attribute 324 illustrated in FIG. 6, and thus a detailed description thereof will be omitted herein.

The evaluation value 332 stores therein information on user's preference per distribution information attribute 331. For example, a higher value is stored for an attribute, which is assume to be of higher user interest, among the attributes stored in the distribution information attribute 331. On the other hand, a lower value is stored for an attribute, which is assumed to be of lower user interest, among the attributes stored in the distribution information attribute 331.

The evaluation value calculation method will be described in detail with reference to FIG. 15.

FIG. 7 illustrates an exemplary simple personal filter for simplified description. For the received title information, other information capable of being selected or refused depending on user's preference can be used as the personal filter.

For example, a database, which is constructed with reference to both the distribution information attribute corresponding to the received title information and the user's previously-set information attribute (user-interested information attribute), can be used as the personal filter. Further, the personal filter can be sequentially updated by a user operation or automatically. Further, a general machine learning algorithm is applied to learn user's preference, thereby updating the personal filter.

Only the distribution information attribute associated with user-interested information attribute can be extracted from the received title information by use of the personal filter.

[Exemplary Title Information Display Screen]

Figure 8:
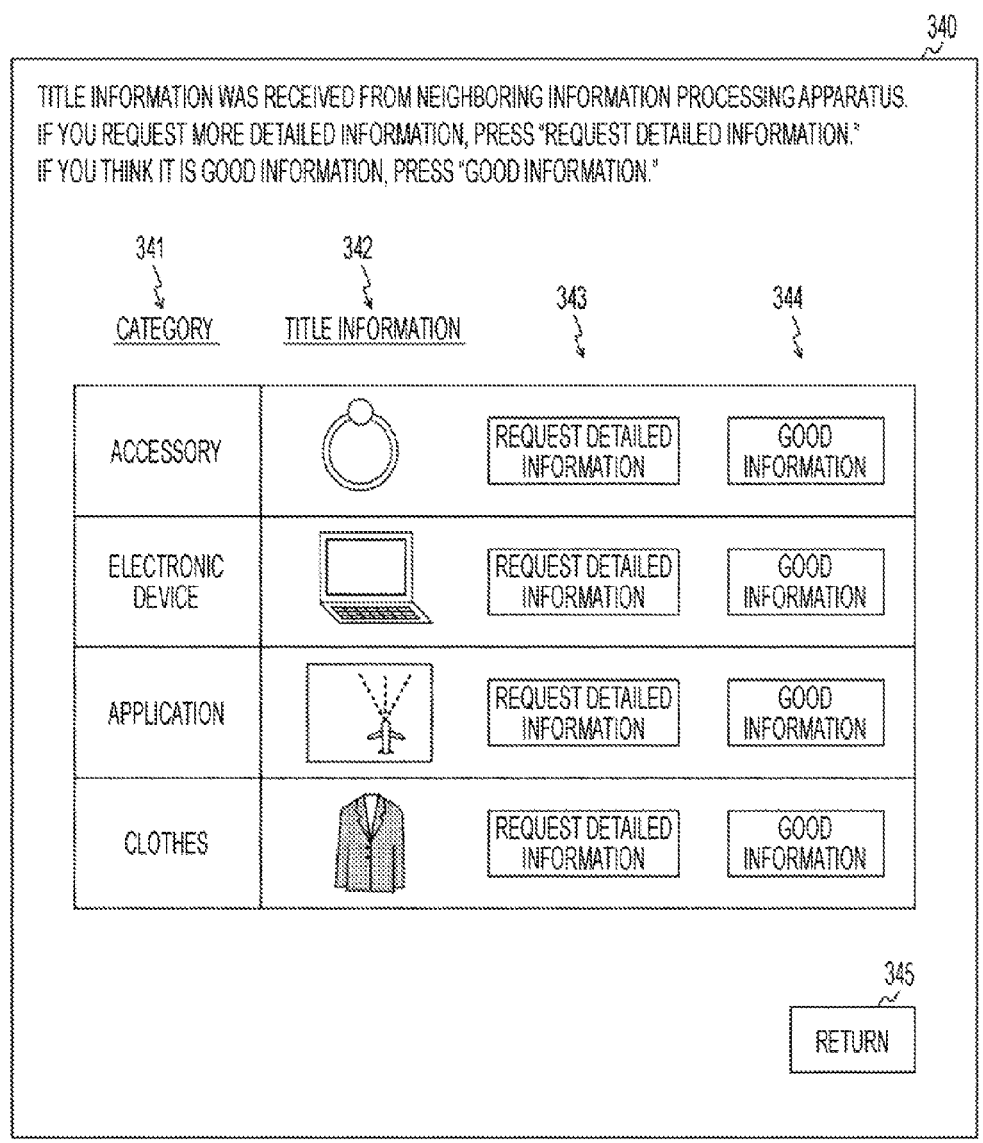
FIG. 8 is a diagram illustrating an exemplary display screen (title information display screen 340) displayed on a display unit 180 according to the exemplary embodiment of the present technique.

FIG. 8 is a diagram illustrating an exemplary display screen (the title information display screen 340) displayed on the display unit 180 according to the exemplary embodiment of the present technique.

The title information display screen 340 is a display screen for displaying title information received by the information processing apparatus 100. That is, the title information display screen 340 is displayed on the display unit 180 thereby to notify the reception of the title information to the user. Further, the title information display screen 340 is displayed on the basis of the title information management table 320 illustrated in FIG. 6.

The title information display screen 340 is provided with a distribution information attribute display area 341, a title information display area 342, a detailed information request button display area 343, a good information button display area 344, and a return button 345.

The distribution information attribute display area 341 displays distribution information attribute (category) therein. The distribution information attribute is displayed on the basis of the distribution information attribute 324 in the title information management table 320 illustrated in FIG. 6, for example.

The title information display area 342 displays title information therein. The title information is displayed on the basis of the distribution information 325 in the title information management table 320 illustrated in FIG. 6, for example.

The detailed information request button display area 343 displays a button which is pressed for requesting the detailed information on the title information displayed in the title information display area 342. When the button is pressed, a detailed information request to request the detailed information on the title information displayed in the title information display area 342 is transmitted to the information processing apparatus transmitting the title information.

The good information button display area 344 displays a button which is pressed for notifying that the title information displayed in the title information display area 342 is good information. This button corresponds to "like" in SNS (Social Networking Service), for example. When the button is pressed, feedback information for notifying that the title information is good information is transmitted to the information processing apparatus transmitting the title information displayed in the title information display area 342.

Herein, when a detailed information request or feedback information is transmitted, the information processing apparatus transmitting the title information is specified on the basis of the terminal identifier 322 illustrated in FIG. 6, for example.

The return button 345 is pressed for returning to the previously-displayed display screen.

[Exemplary Management Contents of Information Distribution Log]

Figure 9:
FIG. 9 is a diagram schematically illustrating exemplary management contents of an information distribution log 350 stored in the storage unit 140 according to the exemplary embodiment of the present technique.

FIG. 9 is a diagram schematically illustrating exemplary management contents of the information distribution log 350 stored in the storage unit 140 according to the exemplary embodiment of the present technique.

The information distribution log 350 is a database for recoding and managing exchanges of the detailed information requests, the feedback information, and the like for the title information exchanged between information processing apparatuses. That is, the information distribution log 350 is a database for managing how the neighboring information processing apparatuses react to each item of title information transmitted from the information processing apparatus 100.

The information distribution log 350 associates and stores therein content ID 351, detailed information request reaction 352, and feedback information reaction 353. The content ID 351 corresponds to the content ID 301 illustrated in FIG. 3 and the content ID 323 illustrated in FIG. 6, and thus a detailed description thereof will be omitted herein.

The detailed information request reaction 352 stores therein the number of times of detailed information request reactions for the title information transmitted to each information processing apparatus. For example, the number of times that the button in the distribution information attribute display area 341 is pressed (a total value of the information processing apparatuses in which the button is pressed) is stored in the title information display screen 340 illustrated in FIG. 8.

The feedback information reaction 353 stores therein the number of times of feedback information reactions for the title information transmitted to each information processing apparatus. For example, the number of times that the button in the good information button display area 344 is pressed (a total value of the information processing apparatuses in which the button is pressed) is stored in the title information display screen 340 illustrated in FIG. 8.

[Exemplary Structure of Server]

Figure 10:
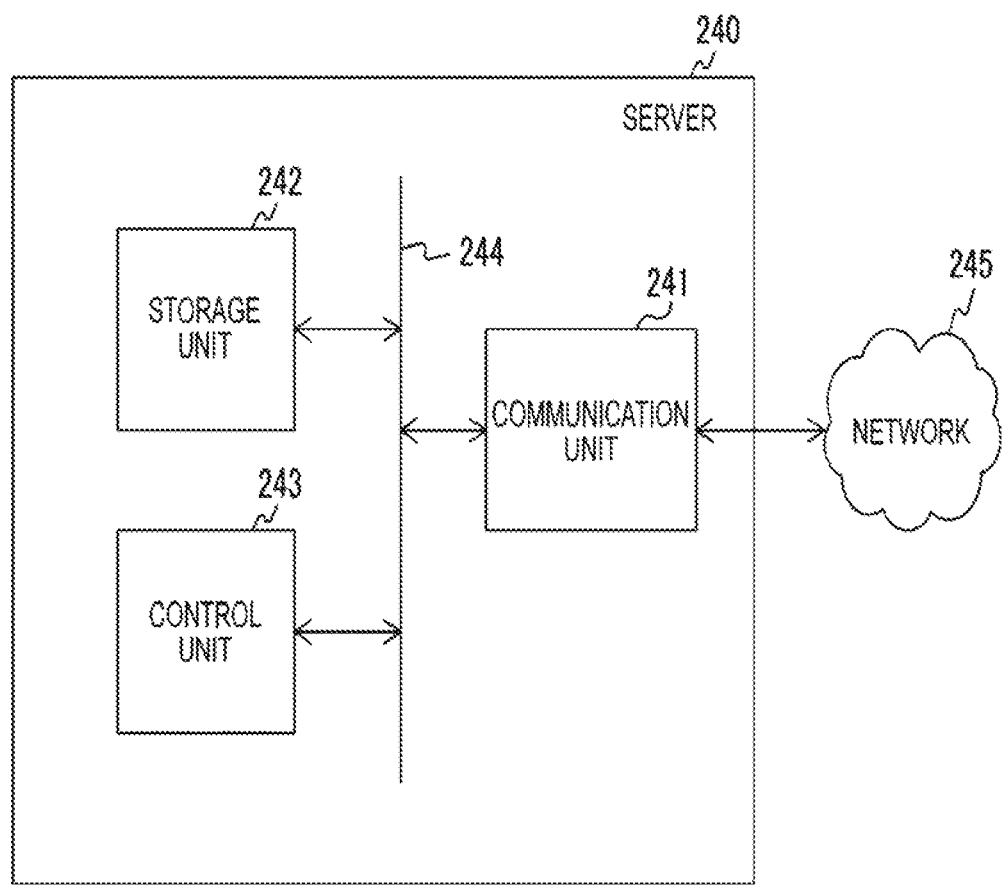
FIG. 10 is a block diagram illustrating an exemplary internal structure of a server 240 according to the exemplary embodiment of the present technique.

FIG. 10 is a block diagram illustrating an exemplary internal structure of the server 240 according to the exemplary embodiment of the present technique.

The server 240 comprises a communication unit 241, a storage unit 242, and a control unit 243. Further, the respective units are connected via a bus 244.

The communication unit 241 is directed for exchanging each item of information via a network 245. For example, the communication unit 241 is connected to the base station 230 and the information processing apparatuses 250 and 260 illustrated in FIG. 1 via the network 245, and exchanges each item of information with each apparatus.

The storage unit 242 is a memory for storing various items of information therein. For example, the storage unit 242 stores therein various items of information (such as control programs) required by the server 240 for performing desired operations. Further, the storage unit 242 stores therein an incentive point management table 360 illustrated in FIG. 11, for example. Further, the storage unit 242 stores therein each content provided in response to a request from each information processing apparatus.

The control unit 243 is directed for controlling each unit in the server 240 according to the control programs stored in the storage unit 242. For example, the control unit 243 performs a signal processing on exchanged information. Further, the control unit 243 is realized by CPU.

[Exemplary Management Contents of Incentive Point Management Table]

Figure 11:
FIG. 11 is a diagram schematically illustrating exemplary management contents of an incentive point management table 360 stored in a storage unit 242 according to the exemplary embodiment of the present technique.

FIG. 11 is a diagram schematically illustrating exemplary management contents of the incentive point management table 360 stored in the storage unit 242 according to the exemplary embodiment of the present technique.

The incentive point management table 360 is a table for managing an incentive point per user with user identifier as key.

The incentive point management table 360 associates and stores therein a user identifier 361 and an incentive point 362. The user identifier 361 corresponds to the user identifier 321 illustrated in FIG. 6, and thus a detailed description thereof will be omitted herein.

The incentive point 362 stores therein a point (incentive point) by which the user can acquire some interest. For example, an incentive point is added each time the user distributes information (title information or detailed information) to others.

For example, the incentive point 362 is updated (added) by uploading the information distribution log (such as the information distribution log 350 illustrated in FIG. 9) transmitted from each information processing apparatus. For example, when the information distribution log is uploaded, the control unit 243 in the server 240 updates (adds) the incentive point of the user of the information processing apparatus which uploads the information distribution log. The control unit 243 in the server 240 then returns the update result (added incentive point) to the information processing apparatus uploading the information distribution log.

A method generally known as affiliate program can be adapted to the mechanism.

[Exemplary Communication]

Figure 12:
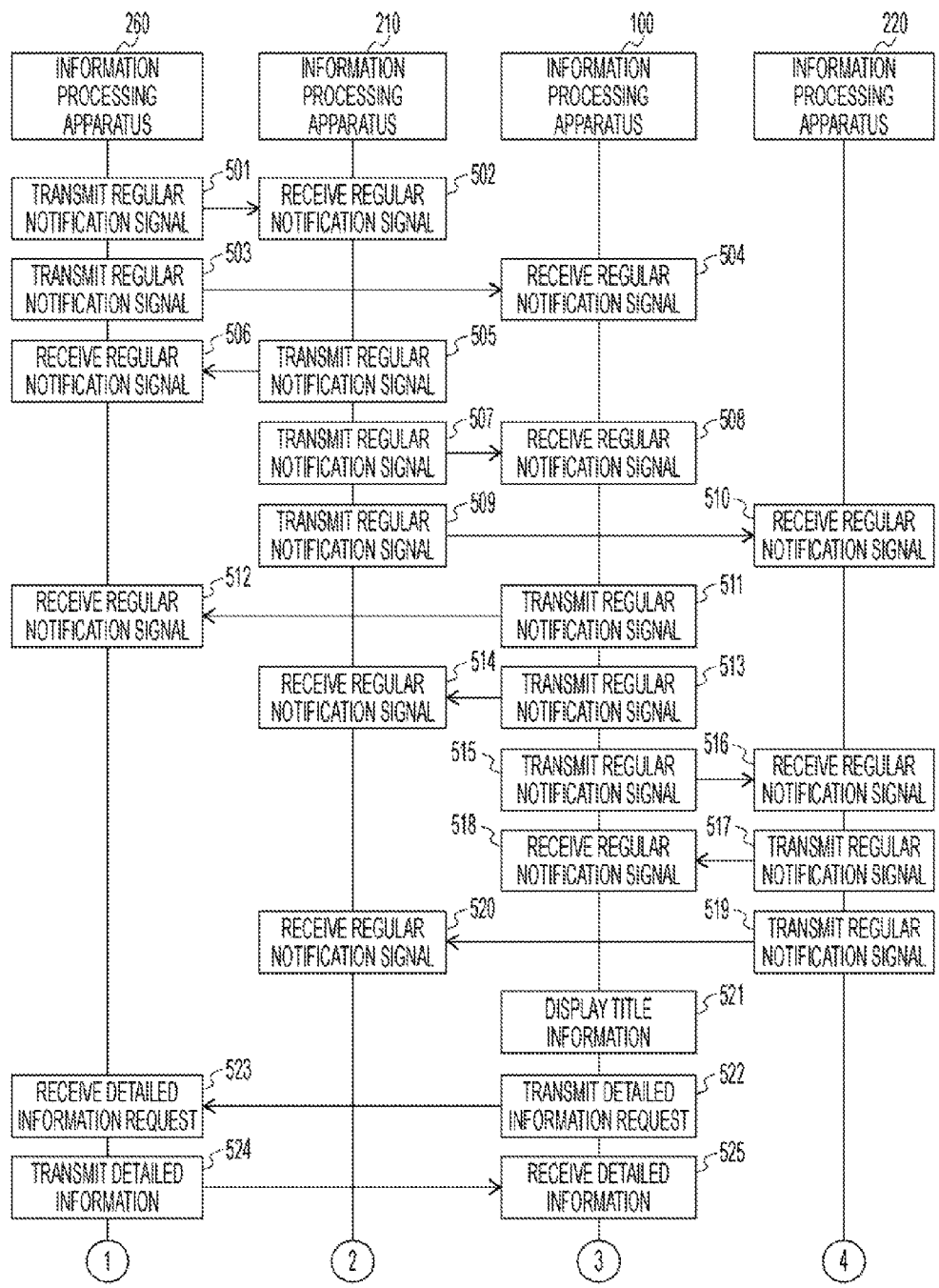
FIG. 12 is a sequence chart illustrating exemplary communication processings in the respective apparatuses configuring the communication system 10 according to the exemplary embodiment of the present technique.
Figure 13:
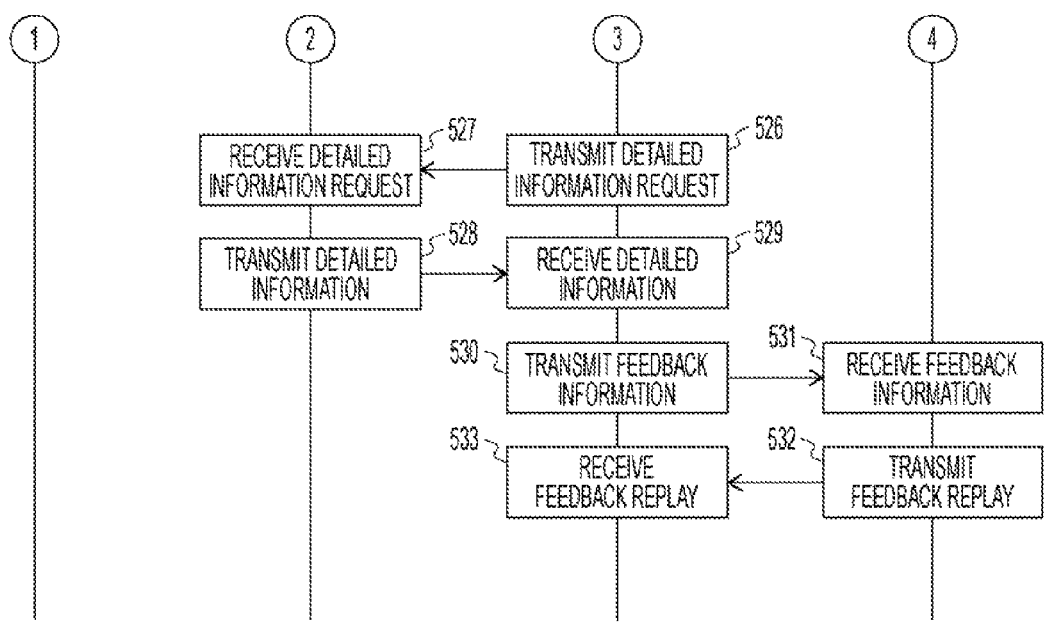
FIG. 13 is a sequence chart illustrating exemplary communication processings in the respective apparatuses configuring the communication system 10 according to the exemplary embodiment of the present technique.

FIG. 12 and FIG. 13 are the sequence charts illustrating exemplary communication processings between the apparatuses configuring the communication system 10 according to the exemplary embodiment of the present technique. FIG. 12 and FIG. 13 illustrate the exemplary communication processings when the information processing apparatuses 100, 210, 220, and 260 are present in the topology illustrated in FIG. 1. FIG. 12 and FIG. 13 further illustrate exemplary information exchange between the information processing apparatuses 100, 210, 220, and 260.

At first, the information processing apparatuses 100, 210, 220, and 260 determine whether to regularly transmit a notification signal. The apparatuses which determine to regularly transmit a notification signal transmit a regular notification signal to each nearby-present apparatus (501 to 520). FIG. 12 illustrates an example (501 to 520) in which all the information processing apparatuses 100, 210, 220 and 260 determine to regularly transmit a notification signal, and transmit a regular notification signal to each nearby-present apparatus. The information processing apparatuses 100, 210, 220, and 260 may determine whether to irregularly transmit a notification signal, and may irregularly transmit a notification signal.

Herein, the regular notification signal is a signal including title information as described above, and corresponds to the beacon 410 illustrated in FIG. 5, for example.

Further, each of the information processing apparatuses 100, 210, and 220 may transfer the title information or the like included in the regular notification signal to other information processing apparatuses in multi-hop relay.

In this way, the information processing apparatuses 100, 210, 220, and 260 mutually exchange the regular notification signals (501 to 520). Further, the information processing apparatuses 100, 210, 220, and 260 receiving the regular notification signal can display the title information on the basis of the received regular notification signal. FIG. 12 and FIG. 13 illustrate only the example in which the information processing apparatus 100 displays title information, and omit the examples in which the information processing apparatuses 210, 220 and 260 display title information.

The control unit 150 in the information processing apparatus 100 displays the title information on the display unit 180 on the basis of the received regular notification signal (521). For example, as illustrated in FIG. 6, the title information display screen 340 is displayed on the display unit 180. When the title information to be displayed is larger than a threshold, the title information to be displayed may be selected. This example will be described in detail with reference to FIG. 15.

In this way, when the title information is displayed on the display unit 180, the control unit 150 in the information processing apparatus 100 monitors whether a user operation is performed. When a user operation is performed while the title information is being displayed on the display unit 180, the control unit 150 in the information processing apparatus 100 then performs the processing on the basis of the user operation.

FIG. 12 and FIG. 13 assume that the user of the information processing apparatus 100 is interested in the title information transmitted from the information processing apparatus 260 and the title information transmitted from the information processing apparatus 210 and performs a user operation of requesting their detailed information. The user operation is to press the button in the detailed information request button display area 343 illustrated in FIG. 6, for example.

In this case, the control unit 150 in the information processing apparatus 100 transmits a detailed information request to request the detailed information on the title information transmitted from the information processing apparatus 260 to the information processing apparatus 260 (522, 523). Further, the information processing apparatus 260 receiving the detailed information request transmits the detailed information corresponding to the detailed information request to the information processing apparatus 100 (524, 525).

In this case, the control unit 150 in the information processing apparatus 100 transmits a detailed information request to request the detailed information on the title information transmitted from the information processing apparatus 260 to the information processing apparatus 260 (522, 523). Further, the information processing apparatus 260 receiving the detailed information request transmits the detailed information corresponding to the detailed information request to the information processing apparatus 100 in response to the detailed information request (524, 525). In this case, the control unit in the information processing apparatus 260 receiving the detailed information request confirms that a nearby user is interested in the transmitted title information, and records the fact. The control unit in the information processing apparatus 260 adds 1 to the item corresponding to the detailed information request reaction 352 illustrated in FIG. 9.

Similarly, the control unit 150 in the information processing apparatus 100 transmits a detailed information request to request the detailed information on the title information transmitted from the information processing apparatus 210 to the information processing apparatus 210 (526, 527). Further, the information processing apparatus 210 receiving the detailed information request transmits the detailed information corresponding to the detailed information request to the information processing apparatus 100 in response to the detailed information request (528, 529). In this case, the control unit in the information processing apparatus 210 receiving the detailed information request confirms that a nearby user is interested in the transmitted title information, and records the fact. For example, the control unit in the information processing apparatus 210 adds 1 to the item corresponding to the detailed information request reaction 352 illustrated in FIG. 9.

In this way, when receiving the detailed information from each apparatus, the control unit 150 in the information processing apparatus 100 displays the received detailed information on the display unit 180. For example, the control unit 150 in the information processing apparatus 100 can automatically display the detailed information on the display unit 180 when receiving the detailed information. Further, for example, the control unit 150 in the information processing apparatus 100 can notify (such as display or audio-output) the reception of the detailed information to the user, and can display the detailed information on the display unit 180 when the user operation of displaying the detailed information is performed.

Further, FIG. 12 and FIG. 13 assume that the user of the information processing apparatus 100 thinks that the title information transmitted from the information processing apparatus 220 is good information, and feeds back the fact that the information is good. The user operation of performing feedback is to press the button in the good information button display area 344 illustrated in FIG. 6, for example.

In this case, the control unit 150 in the information processing apparatus 100 transmits the feedback information for feeding back the fact that the information is good, for the title information transmitted from the information processing apparatus 220, to the information processing apparatus 220 (530, 531). Further, the information processing apparatus 220 receiving the feedback information transmits the feedback replay corresponding to the feedback information to the information processing apparatus 100 in response to the feedback information (532, 533). The feedback replay includes a message destined for the user of the information processing apparatus 100 (a short message such as thank you for your interest, for example). The message is input by the user of the information processing apparatus 220 and stored in the storage unit in the information processing apparatus 220, for example. Further, the control unit in the information processing apparatus 220 receiving the feedback information confirms that the transmitted title information is good information for a nearby user, and records the fact. For example, the control unit in the information processing apparatus 220 adds 1 to the item corresponding to the feedback information reaction 353 illustrated in FIG. 9.

In this way, when receiving the feedback replay from the information processing apparatus 220, the control unit 150 in the information processing apparatus 100 can display the message included in the received feedback replay on the display unit 180.

[Exemplary Operations of Information Processing Apparatuses]

Exemplary operations of the information processing apparatuses will be described below in detail with reference to the drawings. The following exemplary operations are described only for the information processing apparatus 100, but can be similarly applied to the operations of the other information processing apparatuses. The following exemplary operations assume that each item of information is exchanged by use of the second wireless communication unit 120 in communication with each information processing apparatus and each item of information is exchanged by use of the first wireless communication unit 110 in communication with the server 240.

[Exemplary Transmission of Regular Notification Signal]

Figure 14:
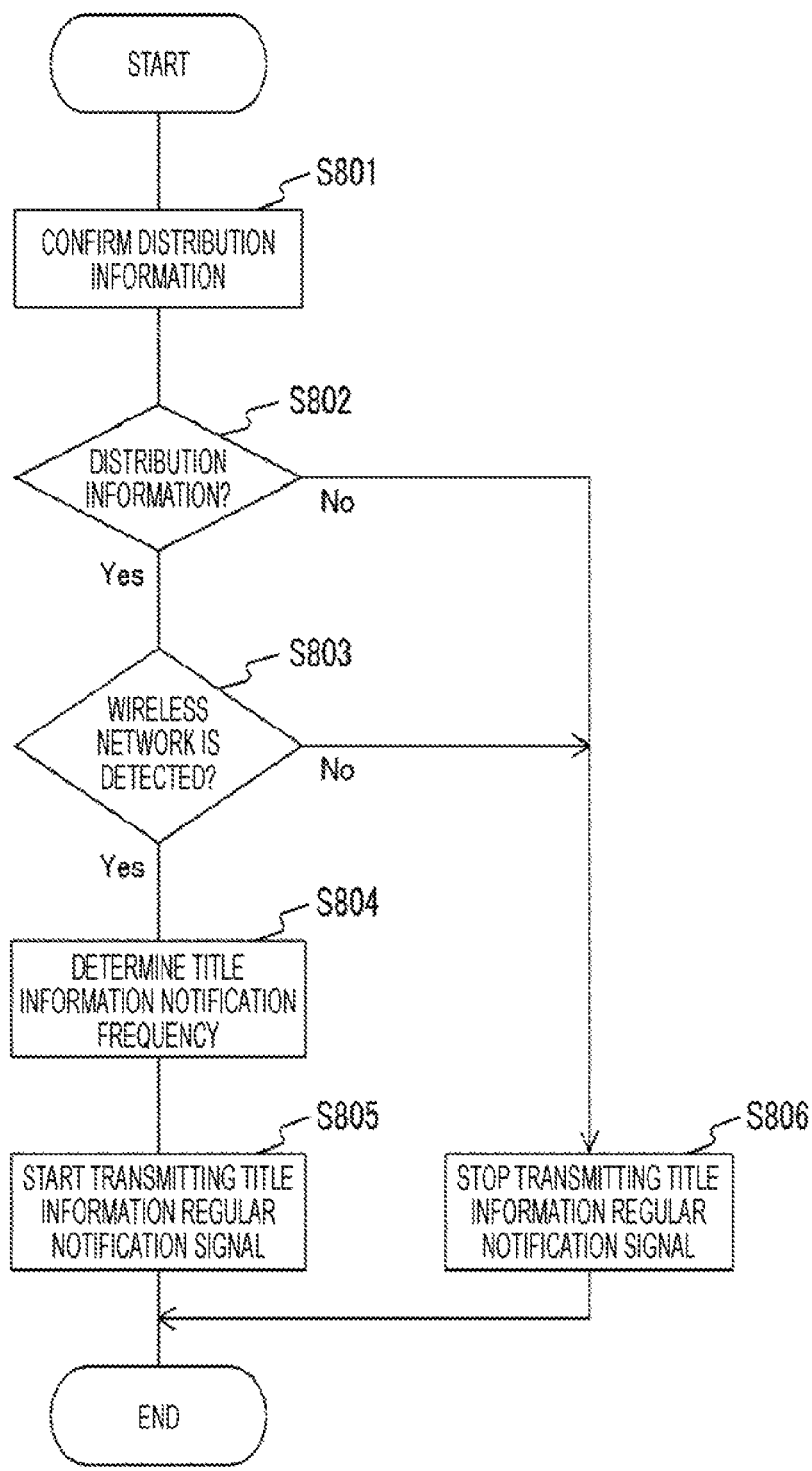
FIG. 14 is a flowchart illustrating an exemplary processing procedure of a regular notification signal transmission processing by the information processing apparatus 100 according to the exemplary embodiment of the present technique.

FIG. 14 is a flowchart illustrating an exemplary processing procedure of the regular notification signal transmission processing by the information processing apparatus 100 according to the exemplary embodiment of the present technique.

Herein, when the information processing apparatus 100 is driven by a battery (such as battery cell), if any information is transmitted, power for the transmission is consumed. Therefore, it is important to reduce useless information transmission and to control for reduction in consumed power. Thus, FIG. 14 illustrates an example in which a determination is made as to whether to regularly transmit a regular notification signal including title information, and the regular notification signal is controlled to be regularly transmitted on the basis of the determination result.

At first, the control unit 150 confirms whether distribution information to be transmitted to other information processing apparatuses is present (step S801). For example, the control unit 150 confirms whether a content for which the valid/invalid information 306 is valid is present in the content management table 300 illustrated in FIG. 3 (step S801).

When valid distribution information is not present (step S802), the control unit 150 determines not to make a title information regular notification (step S806).

When valid distribution information is present (step S802), the control unit 150 determines whether other information processing apparatus capable of making wireless communication with the information processing apparatus 100 is present around the information processing apparatus 100 (step S803). For example, a determination can be made as to whether other information processing apparatus capable of making wireless communication is present nearby by use of a device discovery procedure in a general ad-hoc network or mesh network. Then, when other information processing apparatus capable of making wireless communication with the information processing apparatus 100 is not present around the information processing apparatus 100 (step S803), the processing proceeds to step S806.

When other information processing apparatus capable of making wireless communication with the information processing apparatus 100 is present around the information processing apparatus 100 (step S803), the control unit 150 determines a title information notification frequency (step S804). For example, as described above, the notification frequency can be determined on the basis of the preference information of the user of the information processing apparatus 100. Further, when the title information notification frequency is determined, the control unit 150 records the determined notification frequency in the notification frequency 308 in the content management table 300 illustrated in FIG. 3. The notification frequency 308 in the content management table 300 illustrated in FIG. 3 may be used by omitting the determined title information notification frequency.

Subsequently, the control unit 150 extracts valid title information stored in the storage unit 140, and generates a title information regular notification signal. The control unit 150 then starts transmitting the title information regular notification signal on the basis of the determined notification frequency (step S805). For example, the control unit 150 extracts a content for which the valid/invalid information 306 is valid, among the contents managed in the content management table 300 illustrated in FIG. 3, as valid title information stored in the storage unit 140. The control unit 150 then generates the beacon 410 illustrated in FIG. 5 as the title information regular notification signal by use of the extracted valid title information.

In this way, the information processing apparatuses make wireless communication on one-to-one basis so that the control unit 150 transmits the title information (belongings information) in the network in which the information processing apparatuses are mutually connected. In this case, only when the title information (owner information) to be transmitted is present and an information processing apparatus capable of making wireless communication on one-toone basis is present, the control unit 150 transmits the title information (belongings information).

[Exemplary Reception of Regular Notification Signal]

Figure 15:
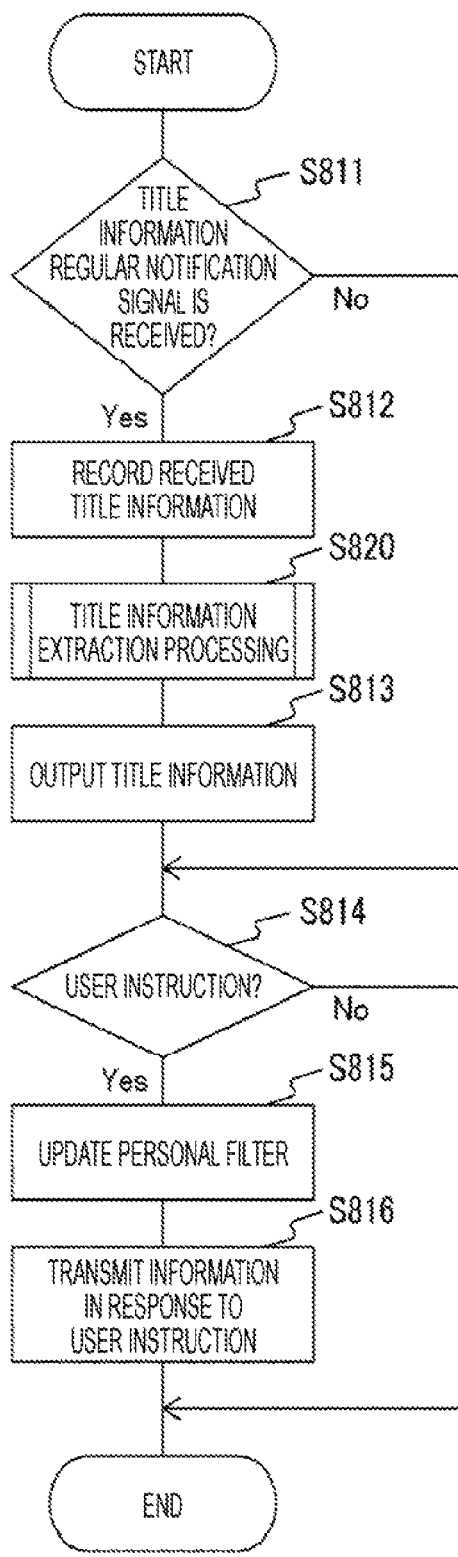
FIG. 15 is a flowchart illustrating an exemplary processing procedure of a regular notification signal reception processing by the information processing apparatus 100 according to the exemplary embodiment of the present technique.

FIG. 15 is a flowchart illustrating an exemplary processing procedure of the regular notification signal reception processing by the information processing apparatus 100 according to the exemplary embodiment of the present technique.

At first, the control unit 150 determines whether it has received the title information regular notification signal from other information processing apparatus (step S811). When it has not received the title information regular notification signal from other information processing apparatus (step S811), the processing proceeds to step S814.

Further, when it has received the title information regular notification signal from other information processing apparatus (step S811), the control unit 150 records each item of information included in the received regular notification signal in the storage unit 140 (step S812). For example, the control unit 150 records each item of information in each field in the title information management table 320 illustrated in FIG. 6 with reference to the title information fields 440 illustrated in FIG. 5. Step S811 is an exemplary reception procedure described in CLAIMS.

Subsequently, the control unit 150 performs the title information extraction processing of extracting the title information to be displayed on the display unit 180 (step S820). The title information extraction processing will be described in detail with reference to FIG. 16.

Subsequently, the control unit 150 outputs the title information extracted in the title information extraction processing, and provides it to the user (step S813). For example, the control unit 150 can display the extracted title information on the display unit 180 and provide it to the user (step S813). Further, for example, the control unit 150 can output the audio based on the extracted title information from the audio output unit 192, and can provide it to the user (step S813). The extracted title information may be output to an external actuator via the I/O interface 130 and provided to the user by the actuator instead of being displayed on the display unit 180. Step S813 is an exemplary display procedure described in CLAIMS.

In this way, when the title information is output (step S813), it is assumed that the user is interested in the output title information, wants not only the title information but also the detailed information and thinks that it is good information. In this case, the user can input an operation of making a desired instruction by use of the operation acceptance unit 170. The operation input may be accepted by a sensor outside the I/O interface 130.

After the title information is output (step S813), the control unit 150 determines whether the input operation of making a user-desired instruction is input (step S814). When the input operation is not accepted (step S814), the operation of the regular notification signal reception processing is terminated.

Further, when the input operation of making a user-desired instruction is accepted (step S814), the control unit 150 determines the distribution information attribute of the instructed title information, and updates the personal filter on the basis of the distribution information attribute (step S815). For example, in the personal filter 330 illustrated in FIG. 7, the evaluation value 332 corresponding to the distribution information attribute 331 of the instructed title information is added with 1.

In this way, the control unit 150 generates (updates) the personal filter (management information) for managing the instructed title information (owner information) per attribute.

For example, the distribution information attribute of the instructed title information is assumed as user-interested distribution information attribute. Thus, the fact that the user-interested distribution information attribute strongly matches with the user's preference is recorded. In this way, the user's preference is sequentially recorded thereby to appropriately extract the title information on the basis of the preference. For example, it is possible to delete the title information with the distribution information attribute which may not match with the user's preference. Further, for example, the information processing apparatus which has not transmitted the title information with the distribution information attribute matching with the user's preference is recorded, and a regular notification signal may be set not to be received from the information processing apparatus. A general machine learning algorithm can be applied to the preference learning method.

Subsequently, the control unit 150 generates information in response to an instruction of a user operation, and transmits the generated information to the information processing apparatus which has transmitted the instructed title information (step S816). For example, the control unit 150 generates a signal including a detailed information request or feedback information for the title information (user-interested title information) instructed by the user operation. The control unit 150 then transmits the generated signal to the information processing apparatus which has transmitted the instructed title information (step S816). Steps S814 and S816 are the exemplary transmission procedures described in CLAIMS.

Herein, the control unit 150 generates a signal including a detailed information request or feedback information, which includes the content ID and the user identifier for the instructed title information. In this way, the information processing apparatus which receives the signal including the content ID and the user identifier can grasp for which information the acquired reaction is.

Figure 16:
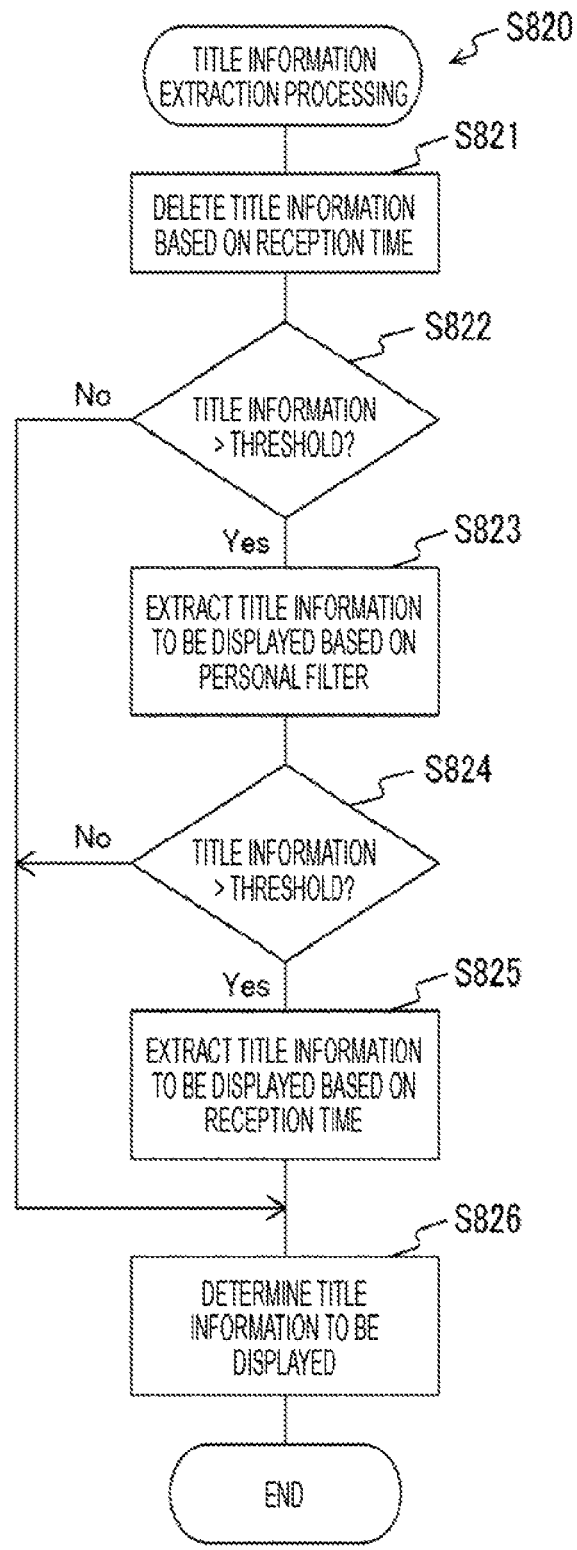
FIG. 16 is a flowchart illustrating an exemplary title information extraction processing procedure in the regular notification signal reception processing by the information processing apparatus 100 according to the exemplary embodiment of the present technique.

FIG. 16 is a flowchart illustrating an exemplary title information extraction processing procedure (the processing procedure in step S820 illustrated in FIG. 15) in the regular notification signal reception processing by the information processing apparatus 100 according to the exemplary embodiment of the present technique. In the title information extraction processing procedure, a processing of confirming which information to be provided to the user from the title information management table 320 (illustrated in FIG. 6) stored in the storage unit 140 is performed.

At first, the control unit 150 deletes the title information on the basis of the reception time (step S821). For example, the control unit 150 extracts the reception time which has elapsed over a predetermined time (such as one day) from the reception time 326 in the title information management table 320, and deletes the title information corresponding to the extracted reception time (step S821).

For example, the transmission source information processing apparatus which transmits the title information received a predetermined time before may not be present around the information processing apparatus 100. Thus, the old title information is deleted from the title information stored in the title information management table 320.

Subsequently, the control unit 150 determines whether the number of items of title information stored in the title information management table 320 is a threshold N (such as 10 to 20) or less (step S822). The threshold N may be a previously-set value or may be set by a user operation.

Then, when the number of items of title information in the title information management table 320 is the threshold N or less (step S822), the control unit 150 determines all the title information in the title information management table 320 as the title information to be provided to the user (step S826).

When the number of items of title information stored in the title information management table 320 is more than the threshold N (step S822), the control unit 150 performs the filter processing of extracting the title information suitable for the user on the basis of the personal filter (step S823). For example, the top M distribution information attributes 331 with the higher values of the valuation value 332 in the personal filter 330 illustrated in FIG. 7 can be extracted, and the title information corresponding to the extracted distribution information attributes 331 can be extracted as the title information suitable for the user (step S823).

It is preferable that user-interested information attributes are widely set in the personal filter in the initial stage. Therefore, it is assumed that many items of information pass through the filter processing using the personal filter in the initial stage. Thus, a predetermined number of items of title information can be extracted on the basis of the reception time from among the title information extracted in the filter processing using the personal filter.

That is, the control unit 150 extracts N items of title information at later reception time from among the title information extracted in the filter processing using the personal filter (step S825). Subsequently, the control unit 150 determines up to N items of title information extracted in this way as the title information to be provided to the user (step S826).

In this way, the control unit 150 causes the received title information (belongings information) to be output. That is, the control unit 150 causes the display unit 180 to display the received title information (belongings information) thereon. The control unit 150 then transmits the evaluation information on the title information (belongings information) to the information processing apparatus transmitting the title information (belongings information) by use of wireless communication on the basis of the user operation for the displayed title information (belongings information).

Herein, the belongings information is information for notifying, to other users, the objects owned by the users of other information processing apparatuses or the objects worn by the users of other information processing apparatuses. The control unit 150 then displays, on the display unit 180, the images of the objects owned by the users of other information processing apparatuses or the object worn by the users of other information processing apparatuses on the basis of the received title information (belongings information).

The evaluation information is a detailed information request or feedback information, for example.

Further, when receiving a plurality of items of title information (owner information), the control unit 150 then extracts the title information (owner information) to be output from among the items of title information (owner information) on the basis of the personal filter (management information).

[Exemplary Reception of Detailed Information Request and Feedback Information]

Figure 17:
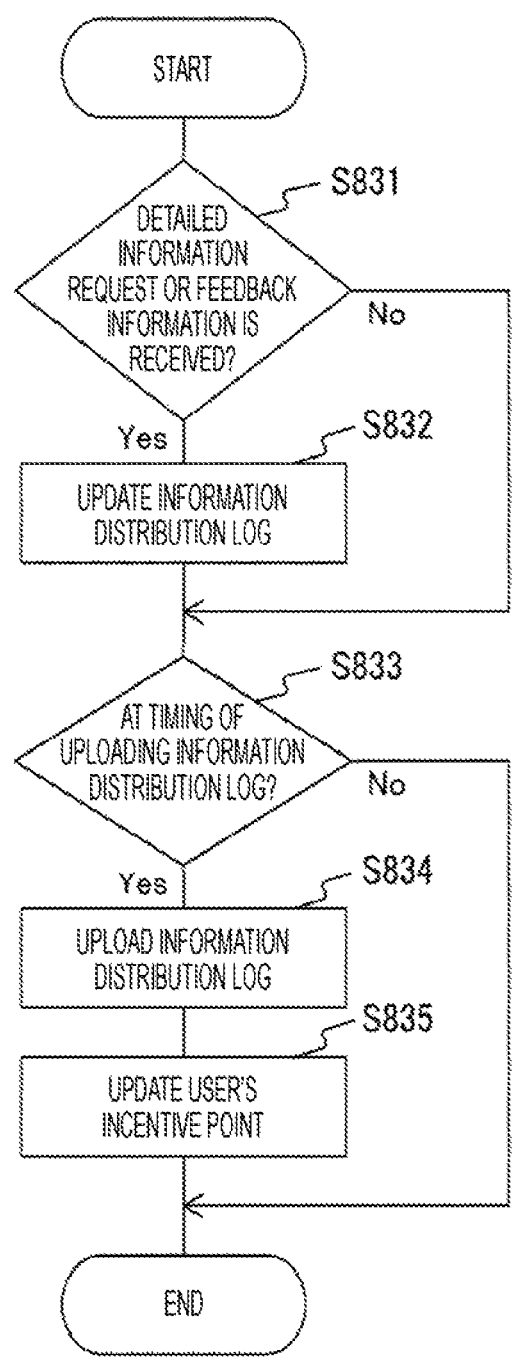
FIG. 17 is a flowchart illustrating an exemplary processing procedure of a processing of receiving a detailed information request and feedback information by the information processing apparatus 100 according to the exemplary embodiment of the present technique.

FIG. 17 is a flowchart illustrating an exemplary processing procedure of the processing of receiving a detailed information request and feedback information by the information processing apparatus 100 according to the exemplary embodiment of the present technique. There is illustrated an example in which the information processing apparatus 100 transmitting a regular notification signal receives a detailed information request or feedback information from a nearby information processing apparatus receiving the regular notification signal in the reception processing.

At first, the control unit 150 determines whether it has received a detailed information request or feedback information from other information processing apparatus (step S831). When it has not received a detailed information request or feedback information (step S831), the processing proceeds to step S833.

When receiving a detailed information request or feedback information from other information processing apparatus (step S831), the control unit 150 updates the information distribution log 350 (illustrated in FIG. 9) managed in the information processing apparatus 100 (step S832). For example, when receiving a detailed information request from other information processing apparatus (step S831), the control unit 150 adds 1 to the detailed information request reaction 352 (illustrated in FIG. 9) corresponding to the content ID included in the detailed information request (step S832). Similarly, for example, when receiving feedback information (step S831), the control unit 150 adds 1 to the feedback information reaction 353 (illustrated in FIG. 9) corresponding to the content ID included in the feedback information (step S832).

Subsequently, the control unit 150 determines whether the information distribution log 350 is at a good point to be uploaded (step S833). For example, when certain reaction events are accumulated in the information distribution log 350, it is determined that the information distribution log 350 is at a good point to be uploaded. Specifically, when the number of reaction events accumulated in the information distribution log 350 exceeds a threshold, it is determined that the information distribution log 350 is at a good point to be uploaded, and the upload processing is activated. The processing of uploading the information distribution log 350 is performed in connection with the server 240 via the base station 230 illustrated in FIG. 1, for example. The processing of uploading the information distribution log 350 may be performed in connection with the server 240 via other information processing apparatus.

When the information distribution log 350 is not at a good point to be uploaded (step S833), the reception processing operation is terminated. When the information distribution log 350 is at a good point to be uploaded (step S833), the control unit 150 is connected to the server 240 via the base station 230 (illustrated in FIG. 1) to perform the upload processing of uploading the information distribution log 350 (step S834). When the processing of uploading the information distribution log 350 is performed in this way (step S834), the control unit 243 in the server 240 updates (adds) the incentive point 362 of the user of the information processing apparatus 100. The control unit 243 in the server 240 then returns the update result (added incentive point) to the information processing apparatus 100.

The control unit 150 confirms that the incentive point is updated on the basis of the information (update result) returned from the server 240 in this way, and updates (clears) as much information distribution log 350 as uploaded (step S835). In this way, the incentive point 362 in the server 240 is updated (added) and the information distribution log 350 in the information processing apparatus 100 is updated (cleared) so that the information distribution log 350 can be passed to the incentive point.

In this way, the control unit 150 sums up the evaluation information (detailed information requests or feedback information) transmitted from other information processing apparatuses and manages them per title information (belongings information) by the information distribution log 350 (illustrated in FIG. 9). When the value added by the summing meets a predetermined condition, the control unit 150 is then provided with the incentive point corresponding to the value from the server 240.

FIG. 17 illustrates an example in which only when a detailed information request or feedback information is received from other information processing apparatus, the incentive point is added to the user distributing the title information. When the title information is displayed by other information processing apparatus, the incentive point may be added to the user distributing the title information.

In this way, according to the exemplary embodiment of the present technique, it is possible to search each item of information on other user, object (such as product or service), or shop present near the user of the information processing apparatus 100. Further, it is possible to easily distribute information (such as advertisement information) in which the user of the information processing apparatus 100 is interested for other users, shops, and the like present around the information processing apparatus 100. That is, it is possible to easily acquire information on the belongings of nearby-present persons.

For example, the user of the information processing apparatus 100 can easily recommend his/her fashion, his/her enjoying contents (such as book, cinema and game), and the like to other persons. A mechanism (such as affiliate-like mechanism) for, when the recommendation leads to purchase, compensating for the recommendation can be realized in the real space while minimizing loads on the server or loads on the communication network. That is, according to the exemplary embodiment of the present technique, an ad-hoc network or mesh network is applied thereby to realize a real-world affiliate system.

<2. Exemplary Applications>

The technique according to the present disclosure is applicable to various products. For example, the information processing apparatuses 100, 210, 220, 250, 260 and the server 240 may be realized as mobile terminals such as Smartphone, tablet PC (Personal Computer), notebook-type PC, portable game terminal or digital camera, fixed terminals such as TV set, printer, digital scanner or network storage, or vehicle-mounted terminals such as car navigation device. Further, the information processing apparatuses 100, 210, 220, 250, 260 and the server 240 may be realized as terminals for making M2M (Machine To Machine) communication (which may be denoted as MTC (Machine Type Communication) terminals) such as smart meter, vending machine, remote monitoring device or POS (Point Of Sale) terminal. Further, the information processing apparatuses 100, 210, 220, 250, 260 and the server 240 may be wireless communication modules (such as integrated circuit modules configured of one die) mounted on the terminals.

[2-1. First Exemplary Application]

Figure 18:
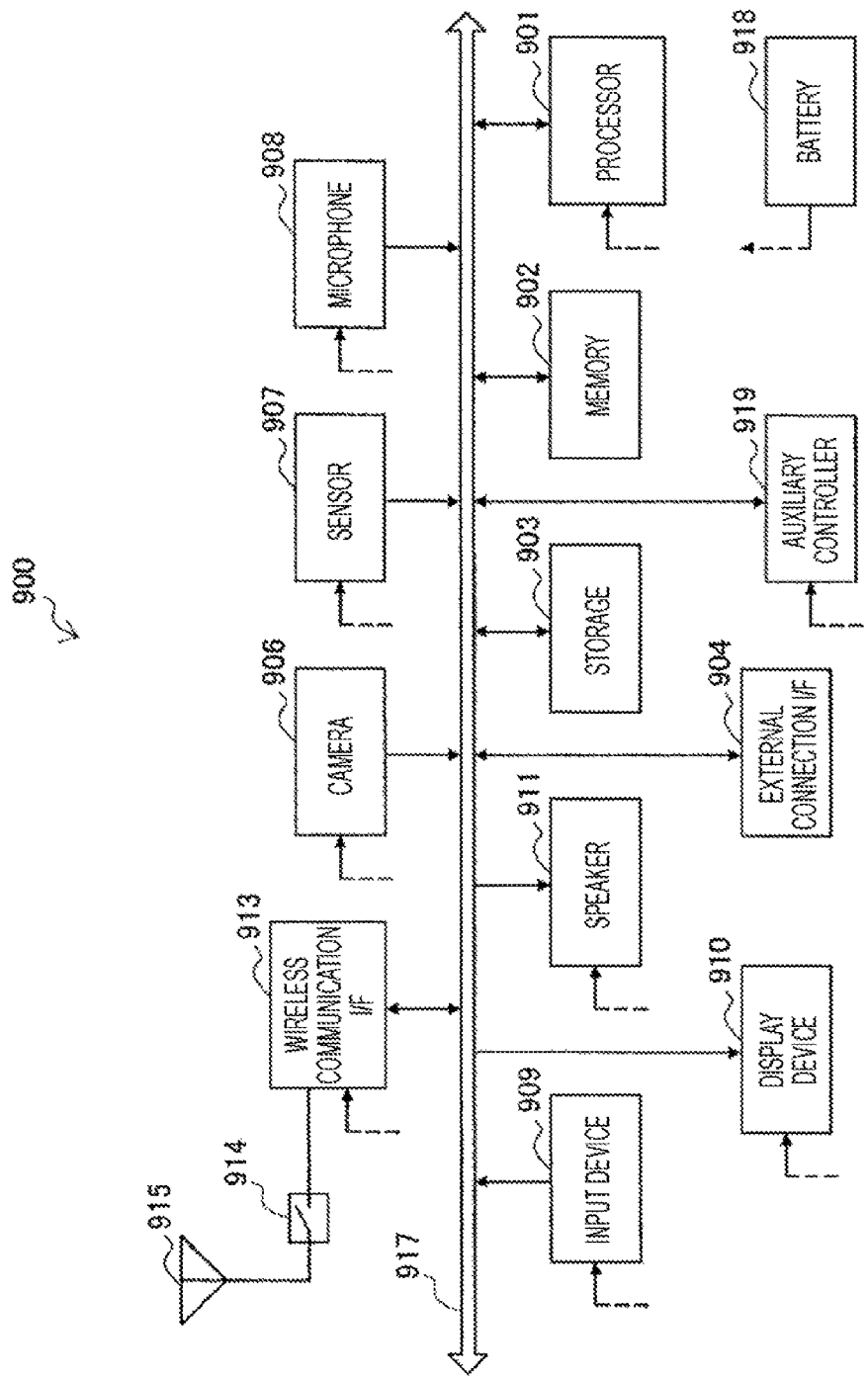
FIG. 18 is a block diagram illustrating an exemplary schematic structure of a Smartphone.

FIG. 18 is a block diagram illustrating an exemplary schematic structure of a Smartphone 900 to which the technique according to the present disclosure is applicable. The Smartphone 900 comprises a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be CPU (Central Processing Unit) or SoC (System on Chip), and controls the functions of the application layer and other layers of the Smartphone 900. The memory 902 includes RAM (Random Access Memory) and ROM (Read Only Memory), and stores the programs and data executed by the processor 901. The storage 903 may include a storage medium such as semiconductor memory or hard disc. The external connection interface 904 is an interface for connecting an external device such as memory card or USB (Universal Serial Bus) device to the Smartphone 900.

The camera 906 has an imaging device such as CCD (Charge Coupled Device) or CMOS (Complementary Metal Oxide Semiconductor), and generates a shot image. The sensor 907 may include a group of sensors such as positioning sensor, gyro sensor, geomagnetic sensor and acceleration sensor. The microphone 908 converts audio input into the Smartphone 900 into an audio signal. The input device 909 includes a touch sensor, keypad, keyboard, button or switch for detecting a touch on the screen of the display device 910, for example, and receives user's operations or input information. The display device 910 has a screen such as liquid crystal display (LCD) or organic light emitting diode (OLED) display, and displays an output image of the Smartphone 900. The speaker 911 converts an audio signal output from the Smartphone 900 into audio.

The wireless communication interface 913 supports one or more of the wireless LAN standards such as IEEE802.11a, 11b, 11g, 11n, 11ac, and 11ad, and makes wireless communication. The wireless communication interface 913 can make communication with other apparatus via a wireless LAN access point in the infrastructure mode. Further, the wireless communication interface 913 can directly make communication with other apparatus in the ad-hoc mode or the direct communication mode such as Wi-Fi Direct. One of two terminals operates as an access point in Wi-Fi Direct unlike in the ad-hoc mode, but communication is directly made between the terminals. The wireless communication interface 913 may typically include a baseband processor, a RF (Radio Frequency) circuit, a power amplifier, and the like. The wireless communication interface 913 may be a one-chip module integrating thereon a memory for storing a communication control program, a processor for executing the program, and an associated circuit. The wireless communication interface 913 may support other kinds of wireless communication systems such as near field communication system, short-distance wireless communication system, or cellular communication system in addition to the wireless LAN systems. The antenna switch 914 switches a connection destination of the antenna 915 among a plurality of circuits (such as circuits in different wireless communication systems) included in the wireless communication interface 913. The antenna 915 has a single or a plurality of antenna devices (such as a plurality of antenna devices configuring a MIMO antenna), and is used for transmitting and receiving a wireless signal by the wireless communication interface 913. It further has a wireless communication interface function of connecting to a public line such as IEEE802.16 or 3GPP specification (such as W-CDMA, GSM, WiMAX, WiMAX2, LTE, or LIE-A), and can make communication with the public line.

Not limited to the example in FIG. 18, the Smartphone 900 may comprise a plurality of antennas (such as antenna for wireless LAN, antenna for short-distance wireless communication system, and antenna for public line communication). In this case, the antenna switch 914 may be omitted from the components of the Smartphone 900.

The bus 917 mutually connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919. The battery 918 supplies power to each block in the Smartphone 900 illustrated in FIG. 18 via a power supply line partially illustrated in a broken line. The auxiliary controller 919 operates the minimum functions in the Smartphone 900 in the sleep mode, for example.

In the Smartphone 900 illustrated in FIG. 18, the second wireless communication unit 120 and the control unit 150 described with reference to FIG. 2 may be mounted in the wireless communication interface 913. Further, at least part of the functions may be mounted in the processor 901 or the auxiliary controller 919.

The processor 901 executes the access point function at the application level so that the Smartphone 900 may operate as wireless access point (software AP). Further, the wireless communication interface 913 may have the wireless access point function.

[2-2. Second Exemplary Application]

Figure 19:
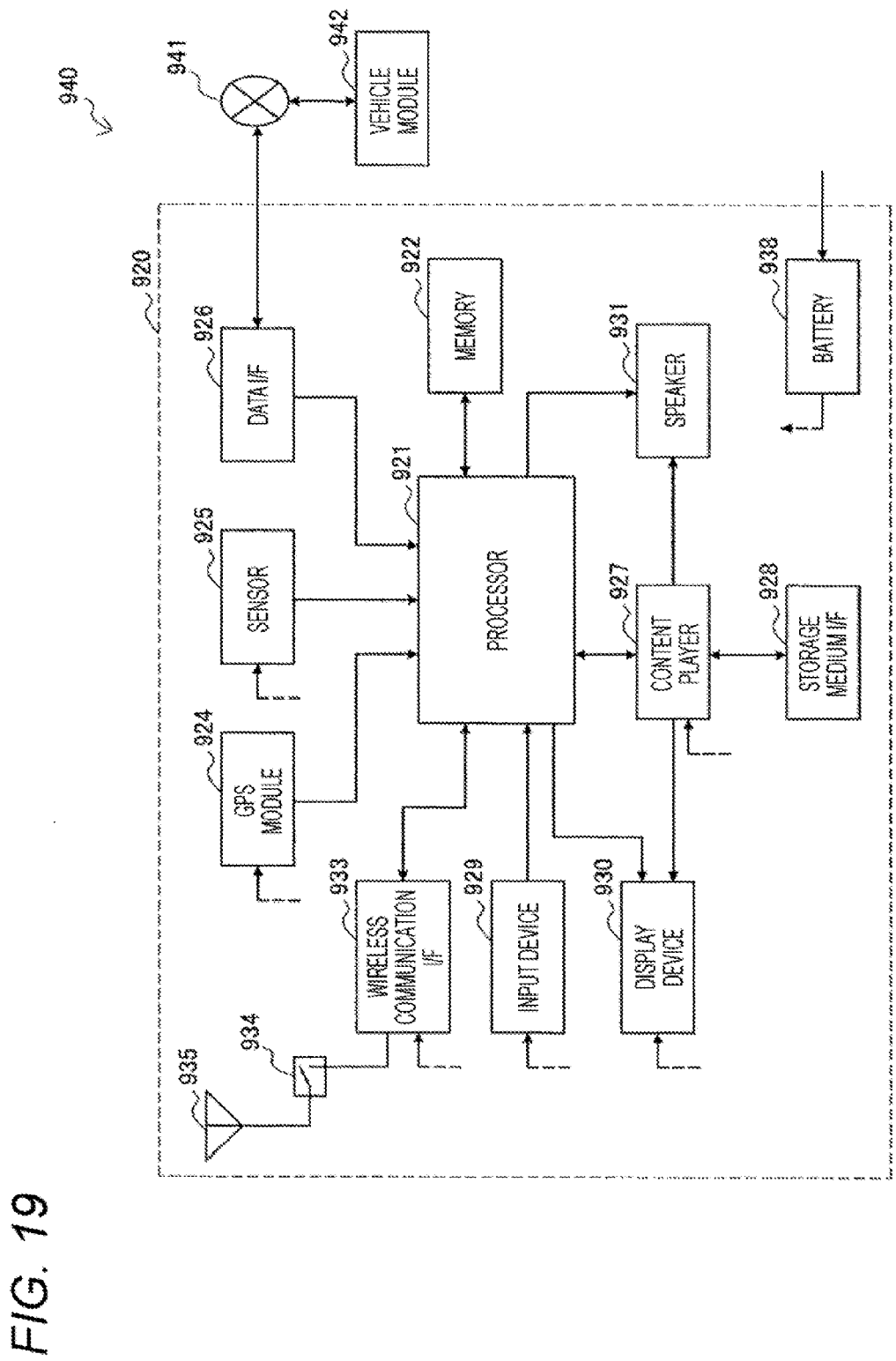
FIG. 19 is a block diagram illustrating an exemplary schematic structure of a car navigation device.

FIG. 19 is a block diagram illustrating an exemplary schematic structure of a car navigation device 920 to which the technique according to the present disclosure is applicable. The car navigation device 920 comprises a processor 921, a memory 922, a GPS (Global Positioning System) module 924, a sensor 925, a data interface 296, a content player 927, a storage medium interface 928, an input device 929, a display device 930, a speaker 931, a wireless communication interface 933, an antenna switch 934, an antenna 935, and a battery 938.

The processor 921 may be CPU or SoC, for example, and controls the navigation function and other functions in the car navigation device 920. The memory 922 include RAM and ROM, and stores the programs and data executed by the processor 921 therein.

The GPS module 924 measures a position (such as latitude and longitude) of the car navigation device 920 by use of a GPS signal received from the GPS satellite. The sensor 925 may include a group of sensors such as gyro sensor, geomagnetic sensor and atmospheric pressure sensor, for example. The data interface 926 is connected to a vehicle-mounted network 941 via a terminal (not illustrated), for example, and acquires the data generated in the vehicle such as vehicle speed data.

The content player 927 reproduces the contents stored in a storage medium (such as CD or DVD) inserted into the storage medium interface 928. The input device 929 includes a touch sensor, button or switch for detecting a touch on the screen of the display device 930, for example, and accepts user's operations or information input. The display device 930 has a screen such as LCD or OLED display, and displays the navigation function or an image of a content to be reproduced. The speaker 931 outputs the navigation function or the audio of a content to be reproduced.

The wireless communication interface 933 supports one or more of the wireless LAN standards such as IEEE802.11a, 11b, 11g, 11n, 11ac and 11ad, and makes wireless communication. The wireless communication interface 933 can make communication with other apparatus via a wireless LAN access point in the infrastructure mode. Further, the wireless communication interface 933 can directly make communication with other apparatus in the ad-hoc mode or the direct communication mode such as Wi-Fi Direct. The wireless communication interface 933 may typically include a baseband processor, a RF circuit, a power amplifier, and the like. The wireless communication interface 933 may be a one-chip module integrating thereon a memory for storing a communication control program, a processor for executing the program, and an associated circuit. The wireless communication interface 933 may support other kinds of wireless communication systems such as near field communication system, short-distance wireless communication system or cellular communication system in addition to the wireless LAN systems. The antenna switch 934 switches a connection destination of the antenna 935 among a plurality of circuits included in the wireless communication interface 933. The antenna 935 has a single or a plurality of antenna devices, and is used for transmitting and receiving a wireless signal by the wireless communication interface 933.

Not limited to the example of FIG. 19, the car navigation device 920 may comprise a plurality of antennas. In this case, the antenna switch 934 may be omitted from the components of the car navigation device 920.

The battery 938 supplies power to each block in the car navigation device 920 illustrated in FIG. 19 via a power supply line partially illustrated in a broken line. Further, the battery 938 accumulates power supplied from the vehicle.

In the car navigation device 920 illustrated in FIG. 19, the second wireless communication unit 120 and the control unit 150 described with reference to FIG. 2 may be mounted in the wireless communication interface 933. At least part of the functions may be mounted in the processor 921.

The technique according to the present disclosure may be realized in a vehicle-mounted system (or vehicle) 940 including one or more blocks in the car navigation device 920, the vehicle-mounted network 941, and a vehicle module 942. The vehicle module 942 generates vehicle data such as vehicle speed, engine frequency or failure information, and outputs the generated data to the vehicle-mounted network 941.

The above exemplary embodiment is merely exemplary for realizing the present technique, and the items according to the exemplary embodiment and the specific items in CLAIMS have a correspondence relationship, respectively. Similarly, the specific items in CLAIMS have a correspondence relationship with the items according to the exemplary embodiment of the present technique denoted with the same names. The present technique is not limited to the exemplary embodiment, and the exemplary embodiment can be variously modified without departing from the scope of the present technique.

The processing procedures described according to the exemplary embodiment may be assumed as a method having a series of procedures, or may be assumed as a program for causing a computer to perform the series of procedures or a recording medium storing the program therein. The recording medium may employ CD (Compact Disc), MD (Mini-Disc), DVD (Digital Versatile Disc), memory card, Blu-Ray® disc, and the like.

The effects described in the present specification are merely exemplary and are not limited, and other effects may be obtained.

The present technique may employ the following structures.

(1)

An information processing apparatus including:

a reception unit for receiving belongings information of the user of other information processing apparatus transmitted from the other information processing apparatus by use of wireless communication; and a control unit for causing the received belongings information to be output and transmitting evaluation information on the belongings information to the other information processing apparatus by use of wireless communication on the basis of a user operation for the belongings information.

(2)

The information processing apparatus according to (1), wherein the belongings information is information for notifying the objects owned by the user of the other information processing apparatus or the objects worn by the user of the other information processing apparatus to other users.

(3)

The information processing apparatus according to (2), wherein the control unit displays, on a display unit, the images of the objects owned by the user of the other information processing apparatus or the objects worn by the user of the other information processing apparatus on the basis of the received belongings information.

(4)

The information processing apparatus according to any of (1) to (3), wherein when the user operation of requesting detailed information on the belongings information is accepted, the control unit transmits a detailed information request to request the detailed information as the evaluation information to the other information processing apparatus.

(5)

The information processing apparatus according to (4), wherein the other information processing apparatus transmits the detailed information corresponding to the detailed information request transmitted from the information processing apparatus to the information processing apparatus, and the control unit causes the detailed information transmitted from the other information processing apparatus to be output.

(6)

The information processing apparatus according to any of (1) to (5), wherein when the user operation of evaluating the belongings information is accepted, the control unit transmits feedback information for evaluating the belongings information as the evaluation information to the other information processing apparatus.

(7)

The information processing apparatus according to any of (1) to (6), wherein the control unit generates management information for managing the belongings information for which the evaluation information is transmitted per attribute.

(8)

The information processing apparatus according to (7), wherein when receiving a plurality of items of belongings information, the control unit extracts owner information to be output from the plurality of items of belongings information on the basis of the management information.

(9)

The information processing apparatus according to any of (1) to (8), wherein a plurality of information processing apparatuses make wireless communication on one-to-one basis so that the other information processing apparatus transmits the belongings information in a network in which the information processing apparatuses are mutually connected, and the control unit transmits the evaluation information in the network.

(10)

The information processing apparatus according to any of (1) to (9), wherein only when the owner information to be transmitted is present and an information processing apparatus capable of making wireless communication on one-to-one basis is present, the other information processing apparatus transmits the belongings information.

(11)

The information processing apparatus according to any of (1) to (10), wherein the other information processing apparatus sums up the evaluation information transmitted from the information processing apparatuses thereby to manage it per item of belongings information.

(12)

The information processing apparatus according to (11), wherein when the value added by the summing meets the predetermined condition, the other information processing apparatus is provided with an incentive point corresponding to the value from a server.

(13)

An information processing method including the procedures of:

receiving belongings information of the user of other information processing apparatus transmitted from the other information processing apparatus by use of wireless communication;

displaying the received belongings information on a display unit; and transmitting evaluation information on the belongings information to the other information processing apparatus by use of wireless communication on the basis of a user operation for the belongings information.

(14)

A program for causing a computer to perform the procedures of:

receiving belongings information of the user of other information processing apparatus transmitted from the other information processing apparatus by use of wireless communication;

displaying the received belongings information on a display unit; and transmitting evaluation information on the belongings information to the other information processing apparatus by use of wireless communication on the basis of a user operation for the belongings information.

REFERENCE SIGNS LIST

10: Communication system
100, 210, 220, 250, 260: Information processing apparatus
101: Bus
110: First wireless communication unit
111, 121: Antenna
120: Second wireless communication unit
130: I/O interface
140: Storage unit
150: Control unit
160: Imaging unit
170: Operation acceptance unit
180: Display unit
191: Status detection unit
192: Audio output unit
230: Base station
240: Server
241: Communication unit
242: Storage unit
243: Control unit
244: Bus
245: Network
900: Smartphone
901: Processor
902: Memory
903: Storage
904: External connection interface 906: Camera
907: Sensor
908: Microphone
909: Input device
910: Display device
911: Speaker
913: Wireless communication interface
914: Antenna switch
915: Antenna
917: Bus
918: Battery
919: Auxiliary controller
920: Car navigation device
921: Processor
922: Memory
924: GPS module
925: Sensor
926: Data interface
927: Content player
928: Storage medium interface
929: Input device
930: Display device
931: Speaker
933: Wireless communication interface
934: Antenna switch
935: Antenna
938: Battery
941: Vehicle-mounted network
942: Vehicle module

The invention claimed is:

1. A first information processing apparatus, comprising:
a reception unit configured to receive belongings information that corresponds to a second user of a second information processing apparatus transmitted from the second information processing apparatus by wireless communication; and
a control unit configured to
control a display unit to display the received belongings information, and transmit, first evaluation information that corresponds to the belongings information to the second information processing apparatus by the wireless communication, based on a first user operation for the belongings information,
wherein the second information processing apparatus adds the received first evaluation information and second evaluation information that is received from at least one of plurality of information processing apparatuses,
wherein a server is configured to provide the second information processing apparatus an incentive point that corresponds to a value based on a condition, and
wherein the value corresponds to the added first evaluation information and the second evaluation information.

2. The first information processing apparatus according to claim 1,
wherein the belongings information is information that further corresponds to at least one of at least a first object of a plurality of objects owned by the second user of the second information processing apparatus or at least a second object of the plurality of objects worn by the second user.

3. The first information processing apparatus according to claim 2,
wherein the control unit is further configured to control the display unit to display an image that corresponds to at least one of at least the first object of the plurality of the objects owned by the second user or at least the second object of the plurality of objects worn by the second user based on the received belongings information.

4. The first information processing apparatus according to claim 1,
wherein based on acceptance of the first user operation that corresponds to request of detailed information corresponding to the belongings information from the second information processing apparatus, the control unit is further configured to transmit a detailed information request that requests the detailed information as the first evaluation information to the second information processing apparatus.

5. The first information processing apparatus according to claim 4,
wherein, in response to the detailed information request, the second information processing apparatus transmits the detailed information corresponding to the detailed information request to the first information processing apparatus, and
the control unit is further configured to control the display unit to further display the detailed information transmitted from the second information processing apparatus.

6. The first information processing apparatus according to claim 1,
wherein based on acceptance of the first user operation that corresponds to evaluation of the belongings information, the control unit is further configure to transmit feedback information for evaluation of the belongings information as the first evaluation information to the second information processing apparatus.

7. The first information processing apparatus according to claim 1,
wherein the control unit is further configured to generate management information to manage the belongings information for which the first evaluation information is transmitted, and
wherein the first evaluation information is transmitted for each of plurality of attributes that corresponds to the belongings information.

8. The first information processing apparatus according to claim 7,
wherein based on reception of a plurality of items of the belongings information, the control unit is further configured to extract owner information from the plurality of items of the belongings information based on the management information.

9. The first information processing apparatus according to claim 1,
wherein each of the plurality of information processing apparatuses are communicably coupled to rest of the plurality of information processing apparatuses to make a network,
wherein in the network, each of the plurality of information processing apparatuses communicates wirelessly on one-to-one basis,
wherein the first information processing apparatus and the second information processing apparatus are among the plurality of information processing apparatuses,
wherein the second information processing apparatus transmits the belongings information in the network, and
wherein the control unit is further configured to transmit the first evaluation information in the network.

10. The first information processing apparatus according to claim 1,
wherein based on presence of only owner information that is to be transmitted and presence of a third information processing apparatus that communicates wirelessly on one-to-one basis, the second information processing apparatus is further configured to transmit the belongings information.

11. The first information processing apparatus according to claim 1,
wherein the second information processing apparatus is further configured to manage the first evaluation information that corresponds to each of plurality of items of the belongings information.

12. An information processing method, comprising:
in a first information processing apparatus:
receiving belongings information that corresponds to a second user of a second information processing apparatus transmitted from the second information processing apparatus by wireless communication;
displaying the received belongings information on a display unit; and
transmitting first evaluation information that corresponds to the belongings information to the second information processing apparatus by the wireless communication based on a first user operation for the belongings information,
wherein the second information processing apparatus adds the received first evaluation information and second evaluation information that is received from at least one of plurality of information processing apparatuses,
wherein a server is configured to provide the second information processing apparatus an incentive point that corresponds to a value based on a condition, and
wherein the value corresponds to the added first evaluation information and the second evaluation information.

13. A non-transitory computer-readable medium having stored thereon, computer-executable instructions, which when executed by a first information processing apparatus, cause the first information processing apparatus to execute operations, the operations comprising:
receiving belongings information that corresponds to a second user of a second information processing apparatus transmitted from the second information processing apparatus by wireless communication;
displaying the received belongings information on a display unit; and
transmitting first evaluation information that corresponds to the belongings information to the second information processing apparatus by the wireless communication based on a first user operation for the belongings information,
wherein the second information processing apparatus adds the received first evaluation information and second evaluation information that is received from at least one of plurality of information processing apparatuses,
wherein a server is configured to provide the second information processing apparatus an incentive point that corresponds to a value based on a condition, and
wherein the value corresponds to the added first evaluation information and the second evaluation information.

* * * * *